(12) United States Patent
Owens et al.

(10) Patent No.: US 10,919,777 B2
(45) Date of Patent: Feb. 16, 2021

(54) CONTROLLED MICROWAVE ASSISTED SYNTHESIS OF FUNCTIONALIZED SILICA NANOPARTICLES

(71) Applicant: Government of the United States as Represented by the Secretary of the Air Force, Wright-Patterson AFB, OH (US)

(72) Inventors: Jeffery Ray Owens, Panama City, FL (US); Derek Lovingood, Lynn Haven, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 224 days.

(21) Appl. No.: 15/981,248

(22) Filed: May 16, 2018

(65) Prior Publication Data

US 2018/0257946 A1 Sep. 13, 2018

Related U.S. Application Data

(62) Division of application No. 14/290,336, filed on May 29, 2014, now Pat. No. 10,000,390.

(Continued)

(51) Int. Cl.
*C01G 39/02* (2006.01)
*D06M 10/08* (2006.01)
(Continued)

(52) U.S. Cl.
CPC .............. *C01G 39/02* (2013.01); *C01B 33/14* (2013.01); *C01B 33/18* (2013.01); *D06M 10/08* (2013.01); *D06M 11/79* (2013.01); *D06M 23/08* (2013.01); *C01P 2002/84* (2013.01); *C01P 2004/03* (2013.01); *C01P 2004/32* (2013.01);
(Continued)

(58) Field of Classification Search
CPC ......... C01G 39/02; C01B 33/18; C01B 33/14; D06M 10/08; D06M 23/08; D06M 11/79; D06M 2101/06; Y10T 428/2933; C01P 2002/84; C01P 2004/03; C01P 2004/32; C01P 2004/52; C01P 2004/64
See application file for complete search history.

(56) References Cited

U.S. PATENT DOCUMENTS

| 6,889,528 B2 * | 5/2005 | Sen ........................ B82Y 20/00 65/390 |
| 2010/0142033 A1 * | 6/2010 | Regnier .............. H01S 3/06716 359/341.1 |

OTHER PUBLICATIONS

Guo et al., "Silver nanoparticles doped silica nanocomposite coated on an optical fiber for ammonia sensing," Sensors and Actuators B 123 (2007) 578-582. (Year: 2007).*

(Continued)

*Primary Examiner* — Anthony J Zimmer
(74) *Attorney, Agent, or Firm* — AFMCLO/JAZ; Chastity D.S. Whitaker

(57) ABSTRACT

A functionalized fiber. The functionalized fiber includes a fiber strand and silica nanoparticles at least partially encapsulating the fiber strand. The silica nanoparticles are synthesized by hydrolyzing a tetramethyl orthosilicate in hydrochloric acid to form silicic acid monomers. The silicic acid monomers are diluted in acetone and irradiated for a time that is less than 90 seconds with an energy source configured to generate microwave frequency energy to polymerize the silicic acid monomers into the silica nanoparticles.

9 Claims, 20 Drawing Sheets

Related U.S. Application Data

(60) Provisional application No. 61/829,557, filed on May 31, 2013.

(51) Int. Cl.
*D06M 23/08* (2006.01)
*C01B 33/14* (2006.01)
*D06M 11/79* (2006.01)
*C01B 33/18* (2006.01)
*D06M 101/06* (2006.01)

(52) U.S. Cl.
CPC ...... *C01P 2004/52* (2013.01); *C01P 2004/64* (2013.01); *D06M 2101/06* (2013.01); *Y10T 428/2933* (2015.01)

(56) References Cited

OTHER PUBLICATIONS

Bae et al, "Superhydrophobicity of cotton fabrics treated with silica nanoparticles and water-repellent agent," Journal of Colloid and Interface Science 337 (2009) 170-175. (Year: 2009).*

Zhang et al., "Carbon Nanofibers Decorated with Poly(furfuyl alcohol)-Derived Carbon Nanoparticles and Tetraethylorthosilicate-Derived Silica Nanoparticles," Langmuir 2011, 27, 14627-14631. (Year: 2011).*

* cited by examiner

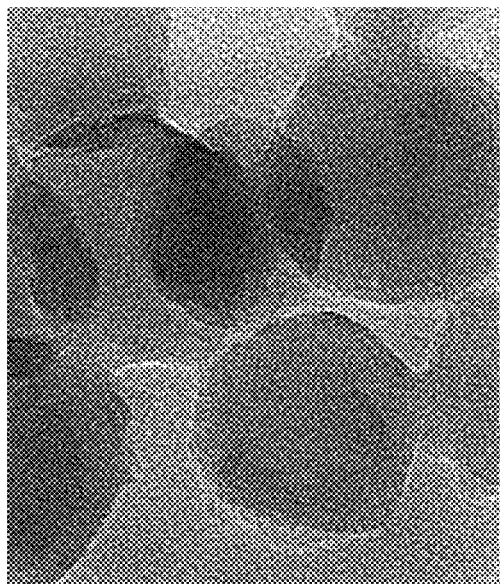 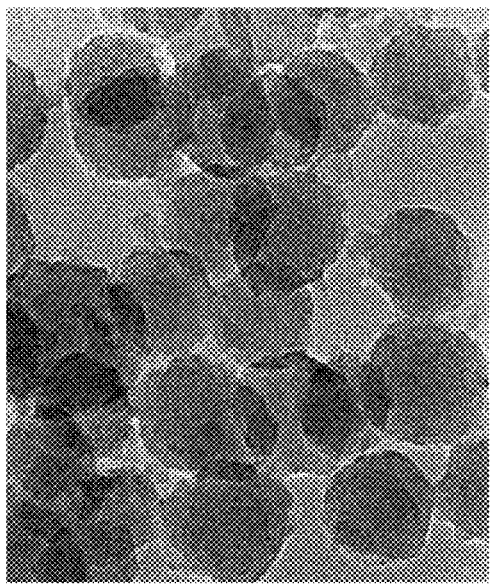
FIG. 22A   FIG. 22B
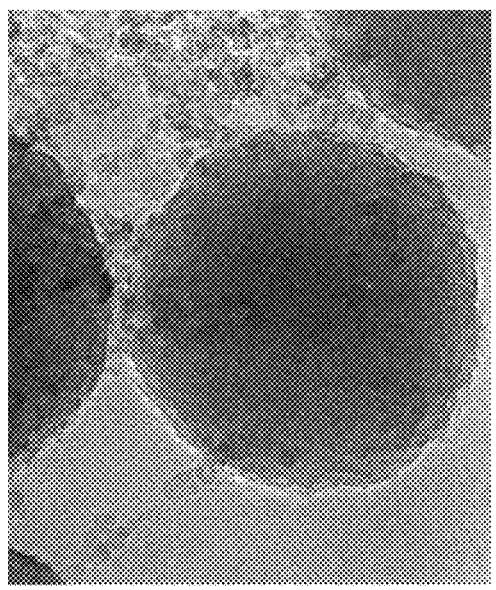 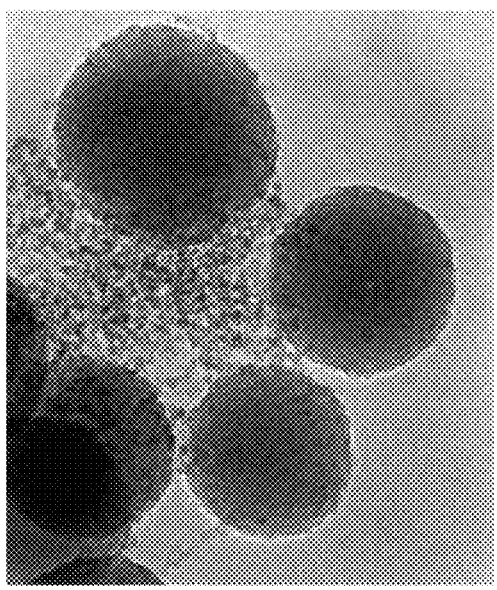
FIG. 23A   FIG. 23B

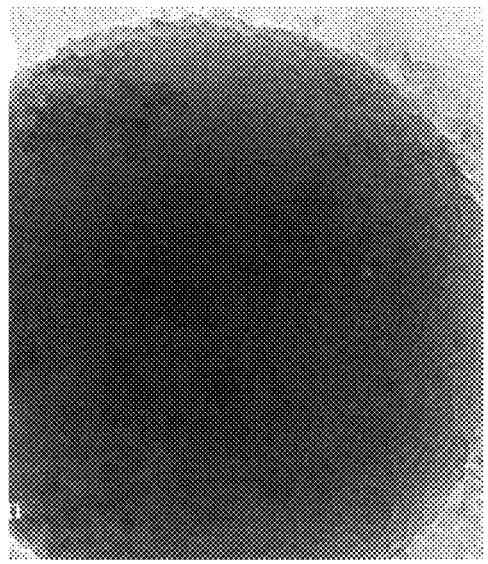 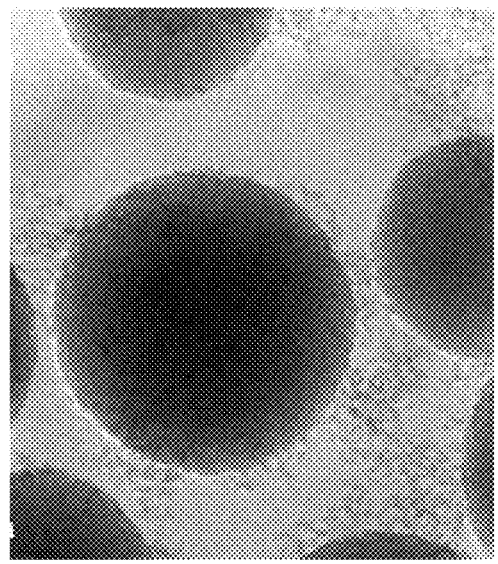
FIG. 24A   FIG. 24B
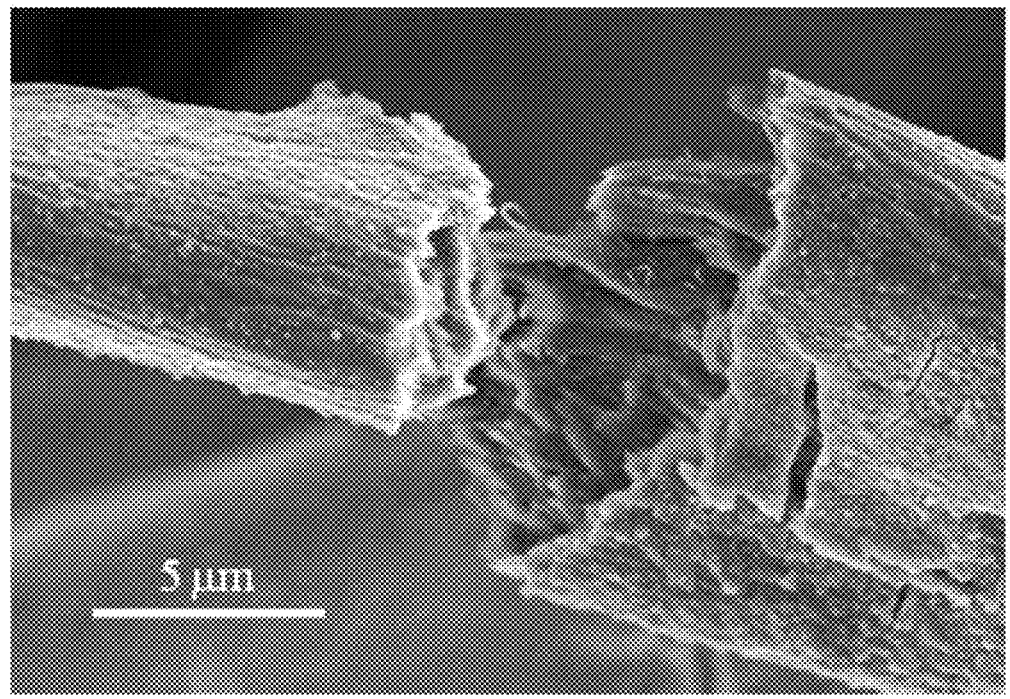
FIG. 25

CONTROLLED MICROWAVE ASSISTED SYNTHESIS OF FUNCTIONALIZED SILICA NANOPARTICLES

This application is a divisional of co-pending U.S. application Ser. No. 14/290,336, filed May 29, 2014, which claims the benefit of and priority to prior filed Provisional Application No. 61/829,557, filed May 31, 2013. This application is also related to International Application No. PCT/GB2014/051644, which is filed on even date herewith. The disclosure of each application is incorporated herein by reference, in its entirety.

RIGHTS OF THE GOVERNMENT

The invention described herein may be manufactured and used by or for the Government of the United States for all governmental purposes without the payment of any royalty. This research was supported, in part, by an appointment to the Postgraduate Research Participation Program at the Air Force Research Laboratory, administered by the Oak Ridge Institute for Science and Education through an interagency agreement between the U.S. Department of Energy and the Air Force Research Laboratory, Materials and Manufacturing Directorate, Airbase Technologies Division (AFRL/RXQ).

FIELD OF THE INVENTION

The present invention relates generally to nanoparticles and, more specifically, to a synthesis of functionalized nanoparticles.

BACKGROUND OF THE INVENTION

Controlled preparation and growth of functional nanomaterials, including semiconductor quantum dots, carbon nanotubes, and metal oxides, have received considerable attention in the literature and industry because of the potential impact on lucrative areas of electronics, energy production and storage, medicine, and chemical catalysis. Specifically, silica nanoparticles, e.g., $SiO_2$ NP and variants thereof, offer ideal properties, such as transparency to visible wavelengths, dielectric properties, high surface area, ease of functionalization, and relatively low toxicity. These physical properties make silica an attractive material for embedding or encapsulating other materials to form a functionalized protective shell.

Conventional methods to synthesize $SiO_2$ nanomaterials include the Stöber method and the water in oil (w/o) reverse microemulsion method. Both methods involve hydrolysis and condensation reactions of a siloxane source, such as tetraethyl orthosilicate, catalyzed by mineral acids, ammonia, alkali metal hydroxides, and fluoride containing salts. Methods catalyzed by alkaline conditions tend to form sols; acid-catalyzed methods tend to form gels. Variants of both methods include changes in concentration, time, temperature, pH, surfactant, and the use of an additional catalyst. Specific examples are provided in Equations 1-3.

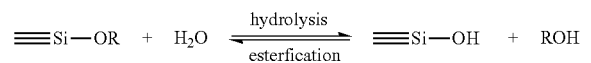

Equation 1

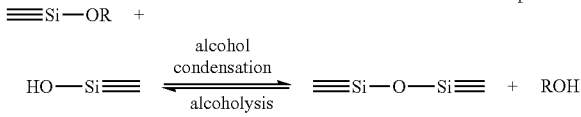

Equation 2

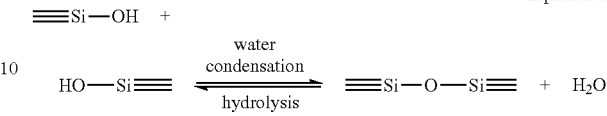

Equation 3

Several parameters may affect the equilibrium of these reactions, including, for example, choice of silicon alkoxide precursor, nature of the catalyst, concentration of silicon alkoxide, $[H_2O]/[\text{siloxane precursor}]$ ratio, choice of solvent, temperature, and pressure. Additionally, a length of the alkoxide group of the siloxane precursor may directly affect the rate of hydrolysis, for example, wherein methoxy- reacts more quickly than ethoxy-, which reacts more quickly than butoxy-. Alkaline catalyzed reactions are commonly favored for $SiO_2$ NP synthesis—the increased reactivity under alkaline catalysis reactions result in immediate condensation upon hydrolysis, whereas stable monomers can be formed using acidic conditions.

$SiO_2$ NPs have also been synthesized by irradiating Stöber reaction solutions at 2.45 GHz using both laboratory microwave reactors and kitchen microwave ovens, although reported results claim uncontrolled growth and a high degree of polydispersity of the silica product. The popularity of microwave-assisted chemistry is not surprising considering these methods often dramatically increase yields, decrease reaction times, and, many times, allows for solvent-free reactions. In microwave chemistry, all components of the reaction (e.g., reagents, solvents, and vessels) are capable of interacting with, or otherwise perturbing, the electromagnetic ("EM") field. Molecular species with permanent dipoles align with the electric field and, through molecular rotation, generate thermal energy (heat) via molecular friction. Dielectric properties of non-conductive material govern the manner in which the material heats when exposed EM fields. A loss factor, tan δ, is a measure of the ability for a material to convert EM energy into heat at a given frequency and temperature. Solvents may be categorized by a loss factor, wherein high tan δ solvents have values greater than about 0.5, medium tan δ solvents have values ranging from about 0.1 to about 0.5, and low tan δ solvents have values less than about 0.1. High loss factor solvents (for example, ethanol, 2-propanol, and methanol having tan δ values of 0.941, 0.799, and 0.659, respectively) have been used in the preparation of $SiO_2$ NPs because a polar solvent is required for solubility of the siloxane precursor.

Despite these improvements in $SiO_2$ NP synthesis, there remains a need for still further improved methods for synthesizing $SiO_2$ NPs, such as methods that result in increased yields, short reaction times, and precise control of size and morphology.

SUMMARY OF THE INVENTION

The present invention overcomes the foregoing problems and other shortcomings, drawbacks, and challenges of producing $SiO_2$ NPs with high yields, short reaction times, and with greater control of size and morphology. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a silica nanoparticle is synthesized by hydrolyzing a silica precursor to form a plurality of monomers, each monomer of the plurality comprising a microwave reactive silicon species. The plurality of monomers is irradiated by an energy source configured to generate microwave frequency energy. Irradiation cases the plurality of monomers polymerize into a silica nanoparticle.

In yet another embodiment, the present invention is directed to a method of synthesizing first and second pluralities of $SiO_2$ nanoparticles by hydrolyzing a first solution having a first water-soluble microwave reactive silicon species to form a first plurality of monomers. The first plurality of monomers is irradiated by an energy course configured to generate a microwave frequency energy, which polymerizes the first plurality of monomers into the first plurality of $SiO_2$ nanoparticles. A second solution having a second water-soluble microwave reactive silicon species is hydrolyzed to form a second plurality of monomers. The second plurality of monomers is irradiated by the energy source, which polymerizes the second plurality of monomers into the second plurality of $SiO_2$ nanoparticles.

Still another embodiment of the present invention is directed to a method of synthesizing a $SiO_2$ nanoparticle by hydrolyzing tetramethyl orthosilicate in hydrochloric acid to form silicic acid monomers. The silicic acid monomers are diluted in acetone and irradiated with an energy source configured to generate microwave frequency energy. The irradiation causes the silicic acid monomers to polymerize into the $SiO_2$ nanoparticle.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 22A and 22B are Transmission Electron Microscopic images of $SiO_2$ NPs having diameters of about 49±5 nm at 10 nm and 20 nm in-plane resolutions, respectively.

FIGS. 23A and 23B are Transmission Electron Microscopic images of $SiO_2$ NPs having diameters of about 163±13 nm at 20 nm and 50 nm in-plane resolutions, respectively.

FIGS. 24A and 24B are Transmission Electron Microscopic images of $SiO_2$ NPs having diameters of about 238±26 nm at 20 nm and 50 nm in-plane resolutions, respectively.

FIG. 25 is a Scanning Electron Microscopic image of a cotton fiber coated with $CdSe/ZnS/SiO_2$ NPs synthesized in accordance with an embodiment of the present invention.

Figure 1:
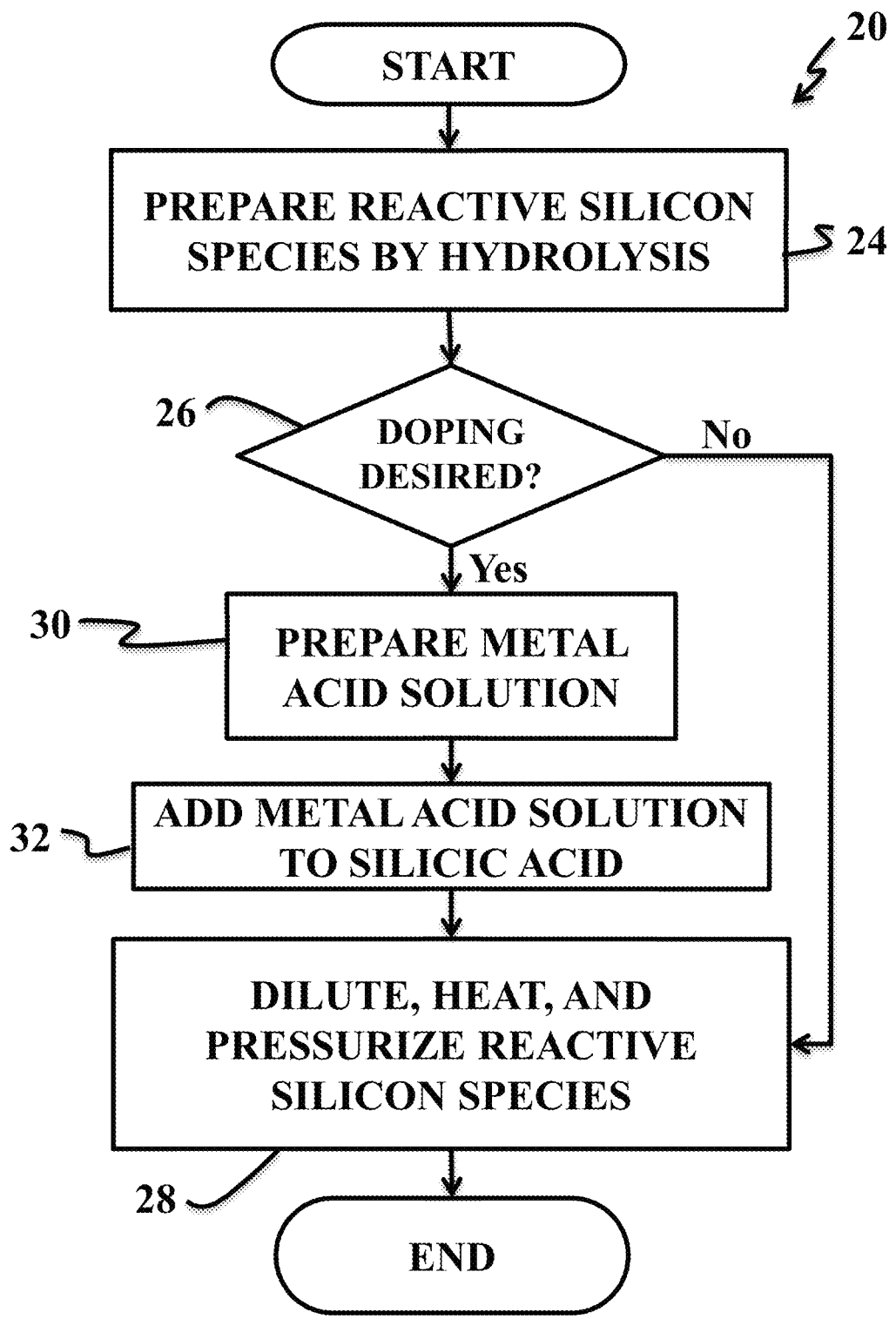
FIG. 1 is a flowchart illustrating a method of synthesizing functionalized $SiO_2$ nanoparticles in accordance with one embodiment of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Turning now to the figures, and in particular to FIG. 1, a flowchart 20 illustrating a method of synthesizing $SiO_2$ NPs in a microwave reactor 22 (FIG. 2), described in greater detail below, according to one embodiment of the present invention is shown. A microwave reactive silicon species is prepared by hydrolysis of a silicate compound (Block 24). If desired ("Yes" branch of Decision Block 26), the $SiO_2$ NPs may be doped; otherwise ("No" branch of Decision Block 26), the method continues to Block 28, as described below. Dopants may include, a metal (for example, Ge, Fe, Ti, Zn, Cu, Co, Fe, Mn, Cr, V, or Zr), a biocide (for example, 8-hydroxyquionoline, quaternary ammonium salt, biguanide, or silver), a chromophore (for example, phthalocyanine, porphyrin, Rose Bengal, or fluorescein derivatives), a flame retardant (for example, tetrabromobisphenol-A), or a semiconductor (for example, platinum, nickel, carbon nanotubes, quantum dots, and other nanomaterials). Doping, according to one embodiment of the present invention, may include preparation of a metal acid solution (Block 52), for example, concentrated hydrochloric acid. In block 32, aliquots of the metal acid solution are titrated into the $SiO_2$ NP solution and allowed to equilibrate.

In Block 28, the microwave reactive silicon species (whether doped or undoped) is diluted with an organic solvent (such as acetone, having tan δ of 0.054). Although not required, a low tan δ solvent is preferred for microwave-assisted reactions such that heating will occur via interaction between the polar silicon species and the electromagnetic ("EM") field, instead of bulk heating of the solvent. Reaction solutions are heated and pressurized via the microwave chamber reactor 22 (FIG. 2) to a reaction temperature ranging from about 100° C. to about 160° C. and a reaction pressure ranging from about 0 psi to about 100 psi, depending on the reaction volume, to form $SiO_2$ NPs.

The microwave chamber reactor 22 may be a single mode reactor (for example, commercially-available reactors operating at 300 W, 850 W, or 3 kW), a multi-mode reactor (for example, commercially-available reactors operating at 2.5 kW or 3 kW), or traveling wave microwave system. For purposes of illustration herein, a multi-mode processing chamber 34 is shown and described with reference to FIG. 2. The microwave chamber reactor 22 includes the processing chamber 34 enclosing a processing space 36 (such as a custom-built 3 kW chamber configured to generate 2.45 GHz radiation), having one or more magnetron inputs (two magnetrons 38, 40 are shown). The chamber 34 may include a lid 42 comprising a dielectric material and, optionally, integrated mode-stirrers (not shown) within the processing space 36 to ensure uniform field distribution. A pedestal 44 within the processing space 36 supports a container 46, which may be constructed from borosilicate and is configured to support one or more samples.

A controller 48 operably controls the microwave chamber reactor 22 and, specifically, may be configured to control a thermostat 50, which is configured to determine a processing temperature within the processing chamber 36, a pump 52, which is operably coupled to the processing space 36 via a port 54 and configured to pressurize the processing space 36, and/or other components of the microwave chamber reactor 22, as would be known to those of ordinary skill in the art.

The microwave-assisted method of FIG. 1 yields $SiO_2$ NPs quickly, effectively, and with precise control of size, as confirmed by dynamic light scattering (examples described in detail below), scanning electron microscopy (examples described in detail below), and transmission electron microscopy (example described in detail below). Resultant $SiO_2$ NPs have a range of diameters that is dependent on initial concentrations of the water-soluble microwave reactive silicon species (for example, tetramethyl orthosilicate, TMOS, or silicic acid).

While wishing to not be bound by theory, it is believed that synthesis of $SiO_2$ NPs according to embodiments of the present invention may occur by formation of a stable siloxane solution, condensation of which is driven by microwave heating. $SiO_2$ NPs formation may be controlled, at least in part, by each parameter, such as the level of microwave heating, solvent selection, reaction vessel pressurizations, and surface interaction with reaction vessel. More specifically, and once the water-soluble microwave reactive silicon species is hydrolyzed, monomers form and oligomers polymerize and depolymerize according to the equilibrium equations above. The result is a large silica network. The condensation reaction may be retarded by the presence of a solvent (for example, acetone) and may not proceed in the formation of $SiO_2$ within the reaction solution. Formation of $SiO_2$ NPs may be facilitated under microwave-assisted heating, wherein a resultant size of the $SiO_2$ NPs may be dependent on an initial silicic acid concentration, a reaction temperature, a reaction time, or a combination thereof.

Control over reaction conditions is critical in the overall formation of silica networks, e.g., whether a sol or a gel is produced. Conventionally, under acid catalysis, siloxane condensation reaction yield gels; however, according to the embodiments of the present invention provided herein, siloxane condensation yields colloidal sols. Formation of colloidal sols may be favored if conditions for depolymerization are present, which allows restructuring of the growing material under conditions described herein.

Figure 2:
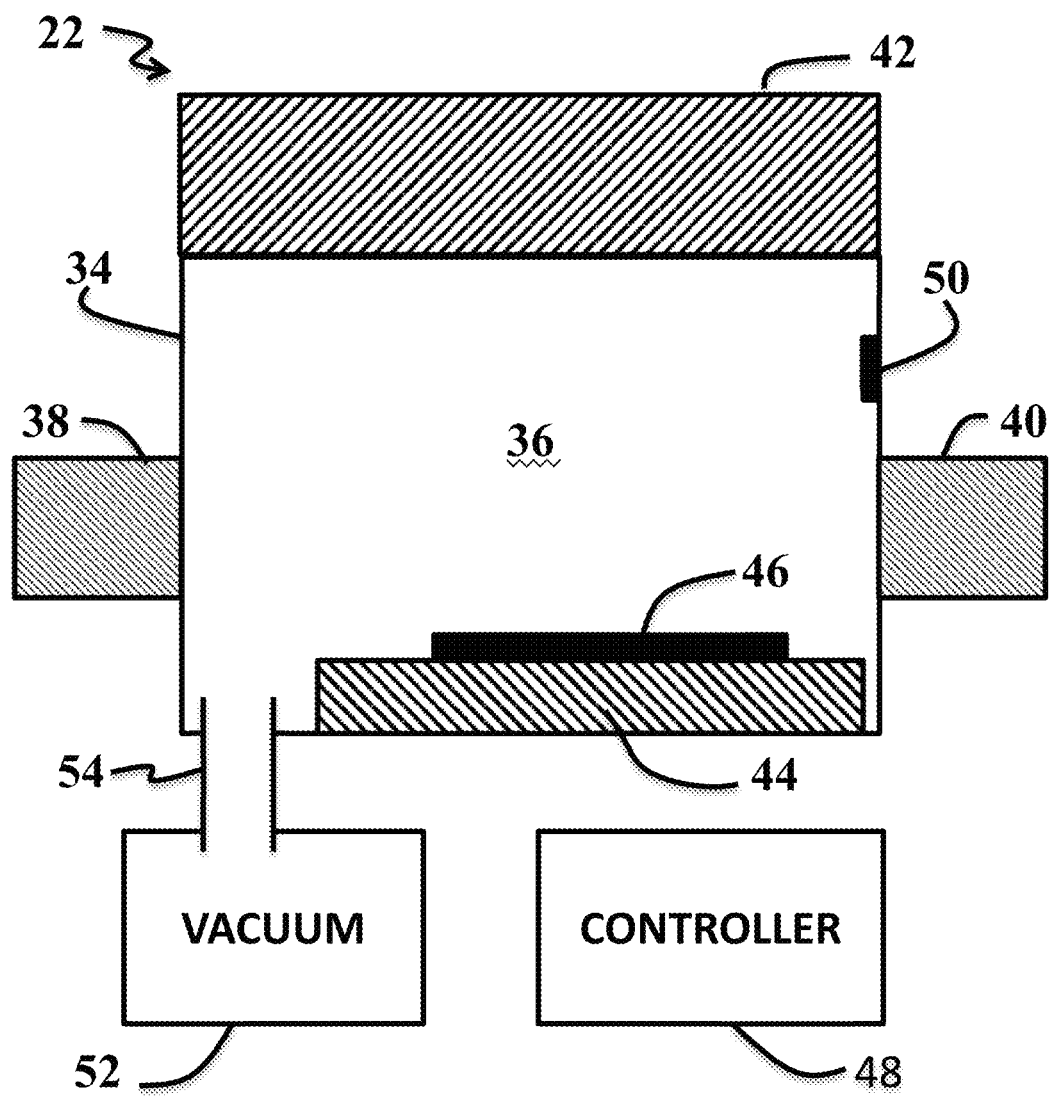
FIG. 2 is a schematic representation of an exemplary microwave chamber reactor suitable for use in performing the method of FIG. 1, shown in cross-section.

While systems modeled by equilibrium equations 1-3, above, are largely susceptible to changes in local chemical environment, several key parameters of the exemplary method of FIG. 1 include: (1) use of TMOS as the silicon alkoxide; (2) concentration of a strong acid as the catalyst (ranging from about 1 mM to about 10 mM); (3) concentration of TMOS (ranging from about 10 mM to about 75 mM); (4) a ratio of water to TMOS ($[H_2O]/[TMOS]$, which may range from about 31:1 to about 55:1); (5) use of an organic solvent, such as acetone; and (6) reaction carried out under elevated temperatures (ranging from about 100° C. to about 150° C.) and pressures (ranging from about 0 psi to about 100 psi). These key parameters may increase the stabilization of reaction intermediates, such as silica octamers, or transition states, such as pentacoordinate or hexacoordinate silanes.

Altogether, the methods for synthesizing $SiO_2$ NPs according to embodiments of the present invention comprise the formation of silicic acid monomers in a low tan δ solvent, such as acetone, which results in a stable silicic acid solution. Upon microwave irradiation, the precursors couple with the EM field and monodisperse $SiO_2$ NPs form. Diameters of the resultant $SiO_2$ NPs are dependent on the concentration of the monomers in the pre-microwave solution. Surface morphology of the $SiO_2$ NPs is dependent on a time duration of the microwave irradiation.

During irradiation, monomers condense to colloidal $SiO_2$ NPs. The process is predominately driven by a water condensation mechanism, which may be assisted by increasing atmospheric pressure.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

Tetramethyl orthosilicate ("TMOS"), ammonium molybdate hydrate, and concentrated hydrochloric acid were purchased from Sigma-Aldrich (St. Louis, Mo.). Acetone was purchased from Fisher Chemical (Pittsburgh, Pa.). All water was filtered using a NANOpure water filtration system (Barnstead, Thermo Scientific, Dubuque, Iowa). All reagents were used without any further purification.

$SiO_2$ NPs were synthesized in a single-mode, 2.45-GHz Discover SP microwave reactor (CEM Corp., Matthews, N.C.), which is configured to produce 300 W of energy. The water-soluble microwave reactive silicon species, silicic acid, was prepared by hydrolysis of TMOS using 1 mM HCl, including 15% TMOS by volume. The silicic acid solution was then diluted, with acetone, by volumetric ratios of silicic acid to acetone: 1:66, 1:50, 1:40, 1:33, 1:28, 1:25, 1:22, and 1:20. Once the mixtures were prepared, 5 mL aliquots of each dilution is individually and separately placed in a 10 mL CEM vial containing a stir bar and snap cap. Each aliquot is heated to a reaction temperature of 125° C., which is reached after a ramp time of about 70 sec at 300 W. After reaching the reaction temperature, the vial is pressurized to about 74 psi and the power is decreased to about 65 W for about 60 sec (although, times varied for time dependent reactions, as described below). Reaction solution temperatures were measured externally using an IR thermometer.

Resulting $SiO_2$ NPs were measured by dynamic light scattering ("DLS") using a Zetasizer Nano90 (Malvern Instruments Ltd., Worcestershire, United Kingdom) to quickly interrogate differences between separate reactions. Accordingly, serial dilutions of the reaction solutions were performed with acetone and water to ensure particle aggregation was limited when sizing. Samples for DLS measurement were prepared by mixing 100 μL aliquots of each sample in 1 mL of solvent in 1 cm quartz cuvettes. DLS size results were determined by intensity measurements.

Zeta potentials were measured in disposable folded capillary cells. Reaction solutions for zeta potential measurements were analyzed for "as prepared" and "cleaned" solutions. "Cleaned" solutions were prepared by centrifugation (Minispin Plus, Eppendorf AG, Hamburg, Germany) of the NP suspensions at 15.7×g for 60 min, decanted, and resuspended, three times, in fresh acetone. Water was used as the solvent for measuring zeta potentials of both "as prepared" and "cleaned" solutions.

Figure 3:
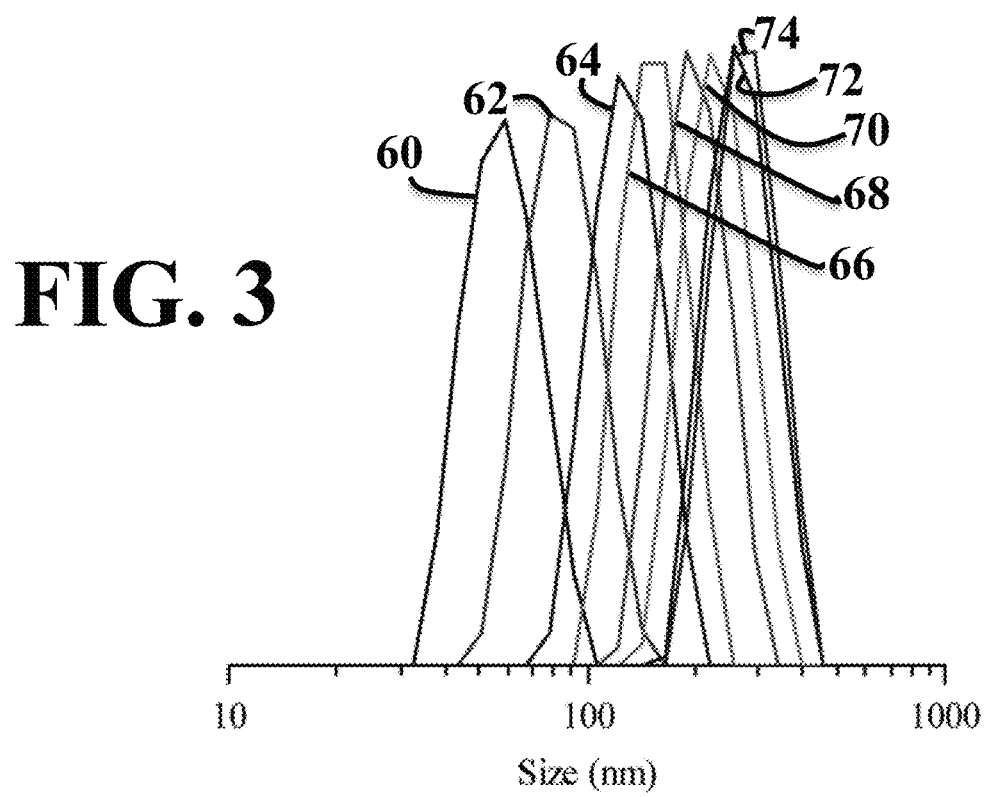
FIG. 3 is a graphical representation of the range of diameters relative to initial concentrations of TMOS when producing $SiO_2$ NPs according to embodiments of the present invention.
Figure 4:
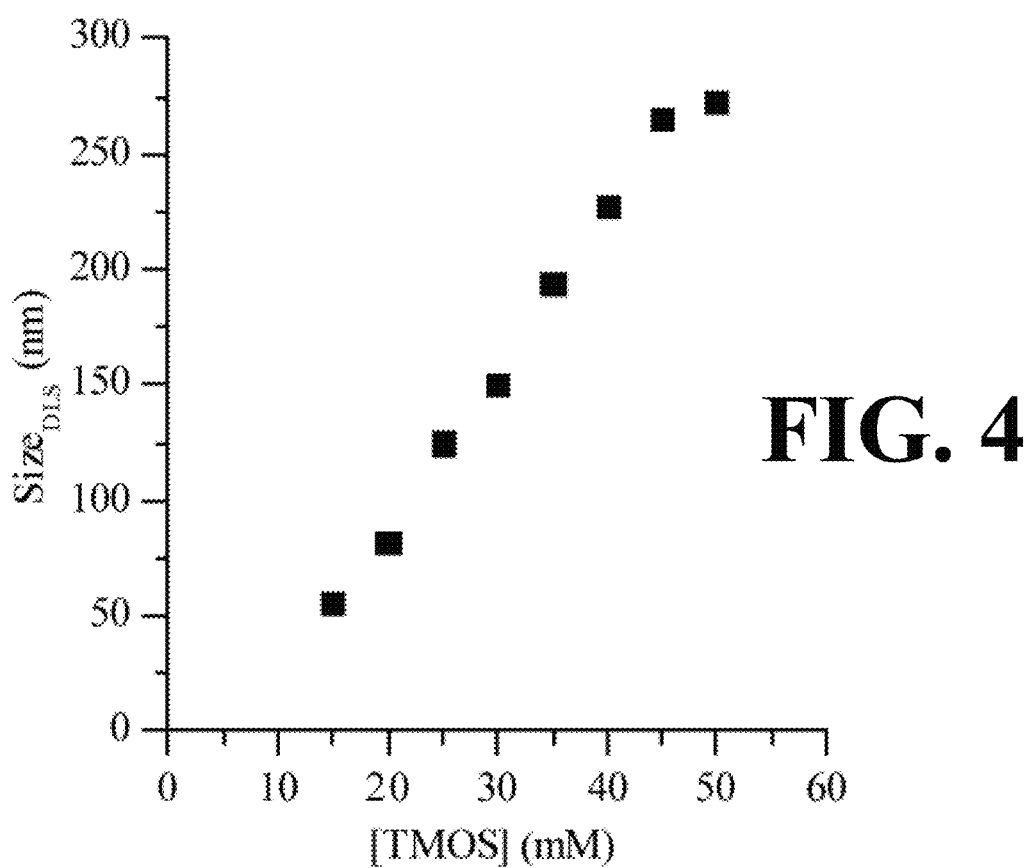
FIG. 4 illustrates a generally linear relationship between diameter and initial concentration of TMOS when producing $SiO_2$ NPs according to embodiments of the present invention.

Diameters of the resultant $SiO_2$ NPs ranged from about 30 nm to about 250 nm, as shown in FIG. 3, and were approximately linearly correlated with initial concentrations of TMOS (see FIG. 4). Initial concentrations and resultant diameters that are graphically shown in FIG. 3 are also provided in Table 1, below.

TABLE 1

| Initial TMNP OS concentration (mM) | Line No. (FIG. 3) | NP diameter by DLS (nm) | NP diameter by SEM (nm) |
|---|---|---|---|
| 15 | 60 | 56 | 48 ± 4 |
| 20 | 62 | 82 | 70 ± 7 |
| 25 | 64 | 125 | 101 ± 10 |
| 30 | 66 | 150 | 127 ± 12 |
| 35 | 68 | 194 | 164 ± 15 |
| 40 | 70 | 227 | 189 ± 19 |
| 45 | 72 | 264 | 206 ± 21 |
| 50 | 74 | 273 | 224 ± 30 |

Figure 5:
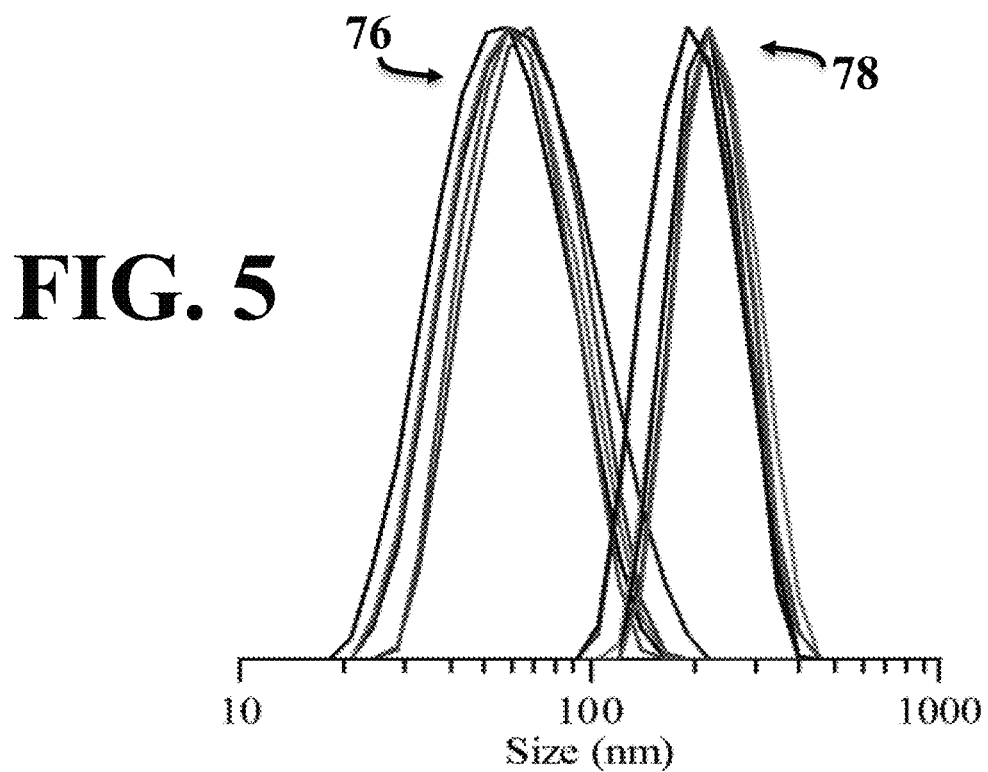
FIG. 5 is a graphic representation of diameters of $SiO_2$ NPs produced in accordance with embodiments of the present invention having initial TMOS concentrations of 25 mM and 50 mM.

Repeatability of small NP formation was determined by five separation reactions, performed according to the method of FIG. 1 above having an initial TMOS concentration of 25 mM, and irradiating the mixtures at 125° C. for 30 sec. The average size of resultant NPs (as measured by DLS, cluster of peaks 76 in FIG. 5) were 57±4 nm. In a similar manner, six mixtures having an initial TMOS concentration of 50 mM were irradiated at 125° C. for 30 sec and yielded NPs (as measured by DLS, cluster of peaks 78 in FIG. 5) of 212±15 nm.

$SiO_2$ NPs were imaged using an S4800 field emission scanning electron microscope ("SEM") (Hitachi, Ltd., Tokyo, JP) to examine surface morphology and to measure average diameter. In that regard, highly polished single-crystal silicon wafers (Semiconductor Processing Co., Boston, Mass.) were cleaned in an ultrasonic bath for 30 min, placed in a hot (80° C.) piranha solution comprising a 3:1 ratio of $H_2SO_4$:30% $H_2O_2$ for 1 hr, and rinsed several times with high-purity DI water. Cleaned solutions were drop-cast onto clean the silicon wafers prior to imaging. All NP samples were sputter-coated with platinum for 1 min prior to imaging.

$SiO_2$ NPs grown from varying, initial concentrations of TMOS were imaged. FIGS. 6A-13B include SEM images (500 nm in plane resolution for each of FIGS. 6A, 7A, 8A, 9A, 10A, 11A, 12A, and 13A with corresponding 100 nm resolution images in FIGS. 6B, 7B, 8B, 9B, 10B, 11B, 12B, and 13B, respectively) of $SiO_2$ NPs grown by varying initial concentrations of TMOS, as described above. FIGS. 6A-13B demonstrate that the resultant NPs are spherical with a roughened surface morphology for all sizes. The SEM images further demonstrate deposits of isolated, amorphous debris, which is not typical of NPs synthesized by conventional, alkaline catalyzed Stöber methods. While wishing to not be bound by theory, it is believed that the deposits are randomly deposited silica that is condensed from residual silicic acid precursor as the solvent evaporates.

Figure 14:
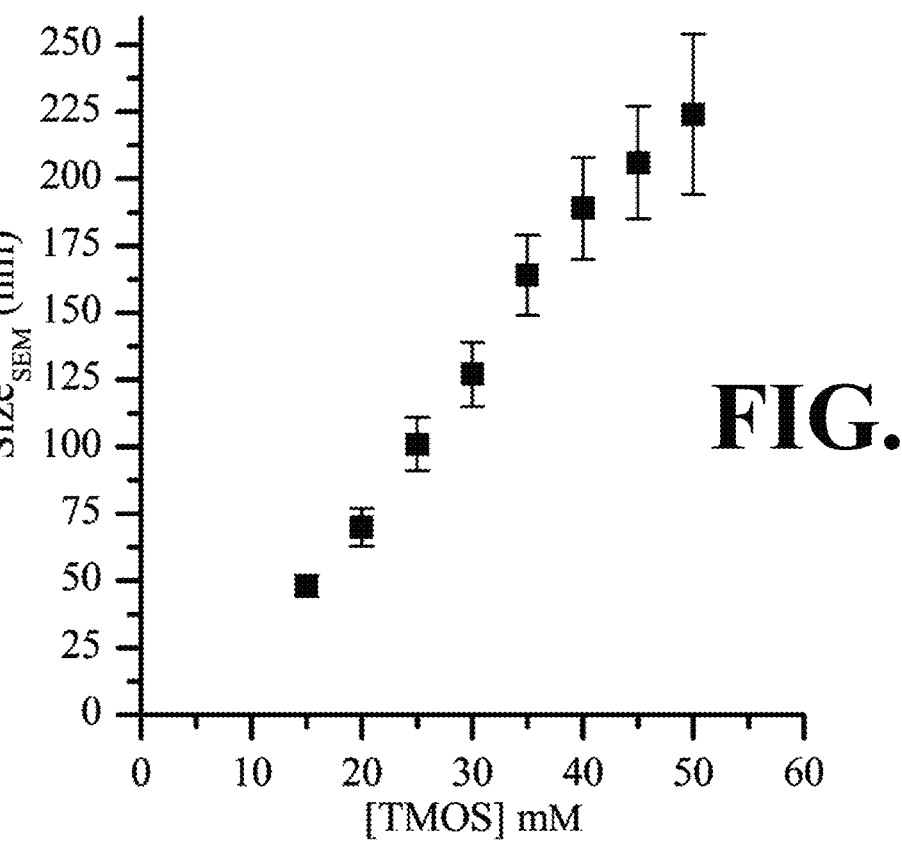
FIG. 14 is a graphical representation of the average $SiO_2$ NP size as measured by Scanning Electron Microscopic images and as a function of TMOS concentration.
Figure 6A:
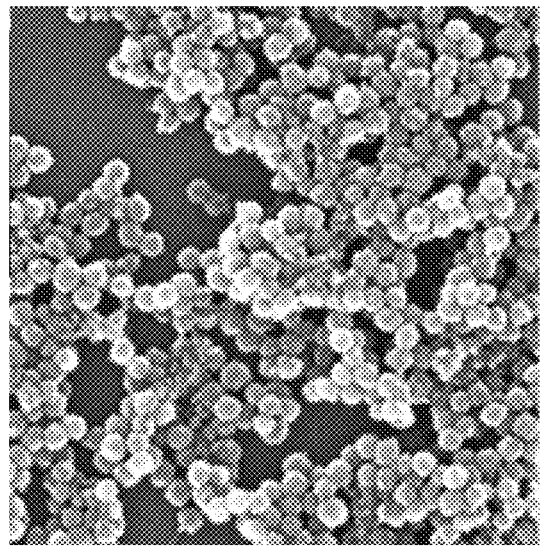
FIGS. 6A, 7A, 8A, 9A, 10A, 11A, 12A, and 13A are Scanning Electron Microscopic images of $SiO_2$ NPs produced in accordance with embodiments of the present invention at varying initial concentrations of TMOS with a 500 nm in-plane resolution.
Figure 6B:
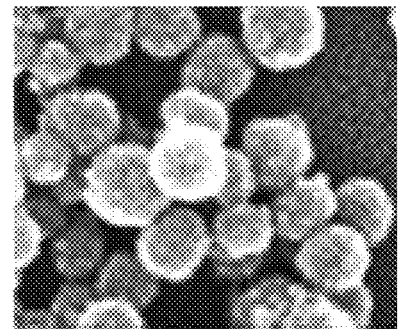
FIGS. 6B, 7B, 8B, 9B, 10B, 11B, 12B, and 13B are Scanning Electron Microscopic images corresponding to FIGS. 7A, 8A, 9A, 10A, 11A, 12A, and 13A, respectively, with a 100 nm in-plane resolution.
Figure 7A:
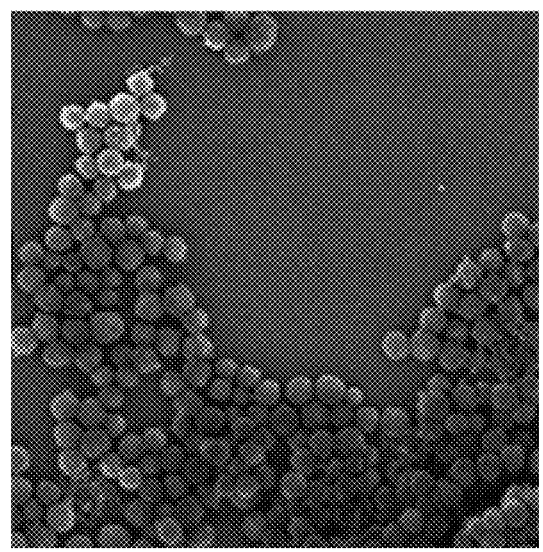
Figure 7B:
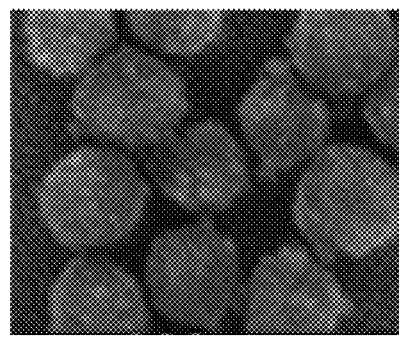
Figure 8A:
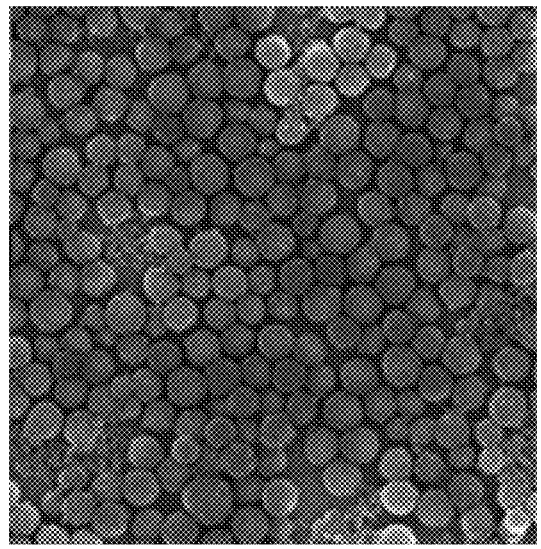
Figure 8B:
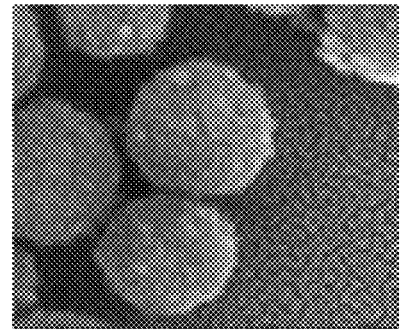
Figure 9A:
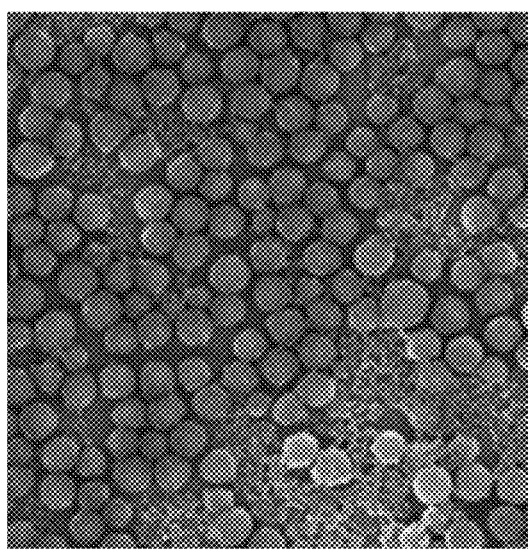
Figure 9B:
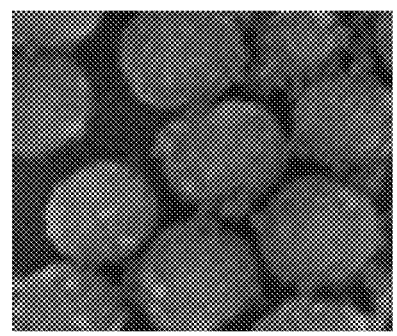
Figure 10A:
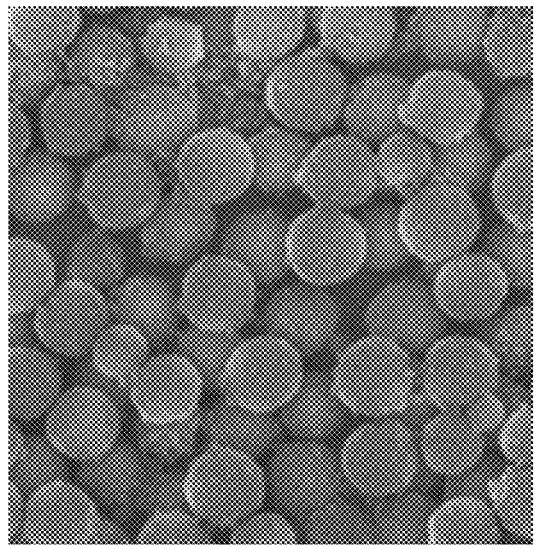
Figure 10B:
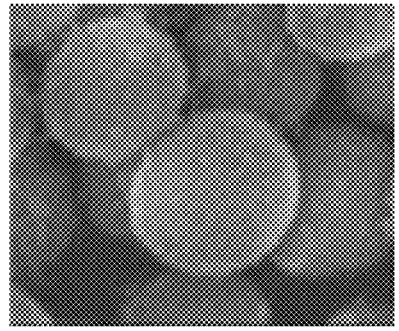
Figure 11A:
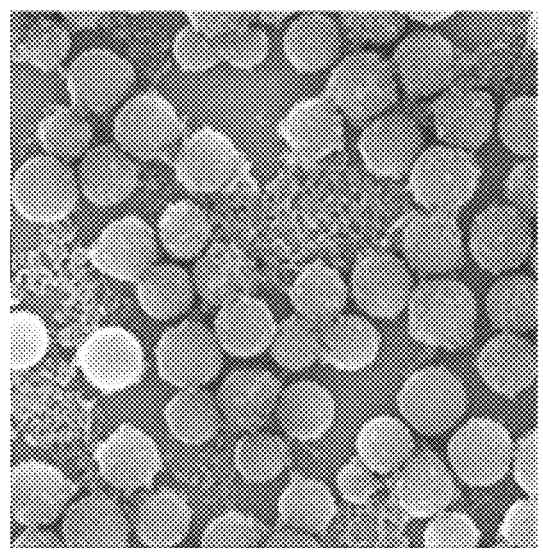
Figure 11B:
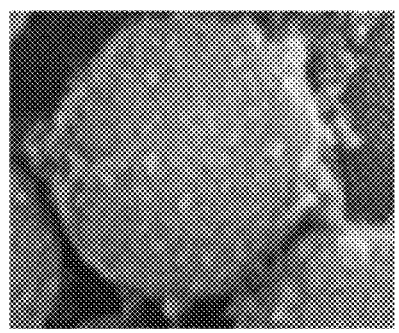
Figure 12A:
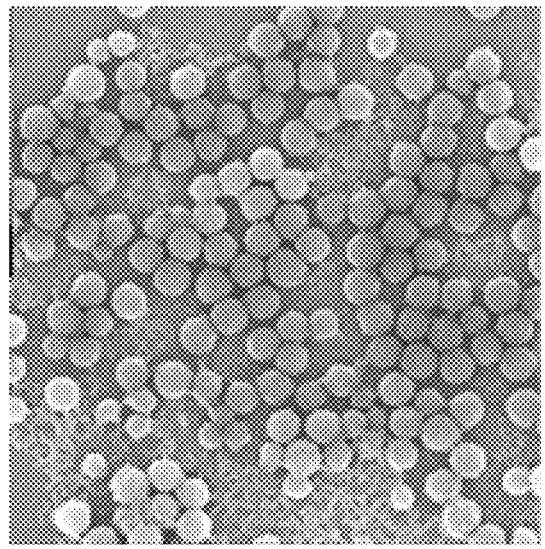
Figure 12B:
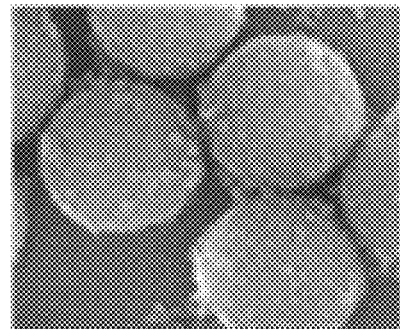
Figure 13A:
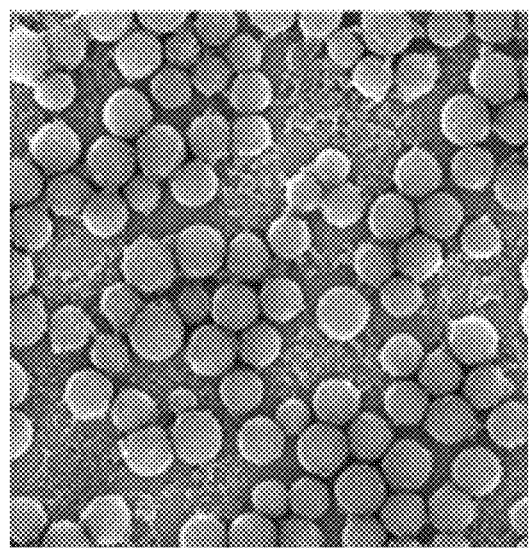
Figure 13B:
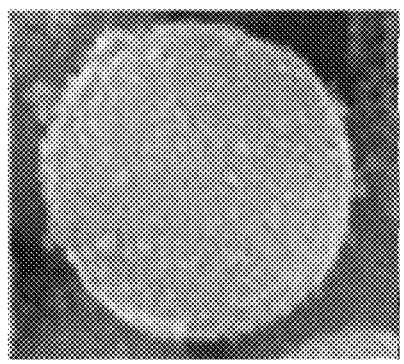

FIG. 14 is a comparison of the average diameters of $SiO_2$ NP as measured by SEM and relative to various, initial TMOS concentrations.

Example 2

Figure 15:
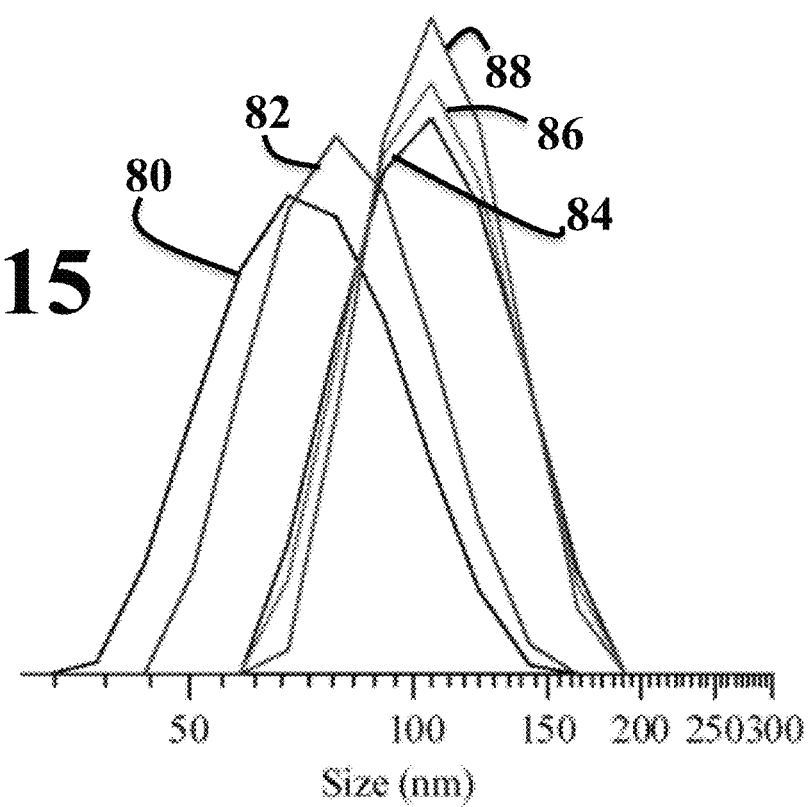
FIGS. 15 and 16 are graphical representations of time-dependent studies of the synthesis of $SiO_2$ NPs according to an embodiment of the present invention.

A time-dependent study of synthesis methods according to embodiments of the present invention were carried out in five separate reactions, each having an initial TMOS concentration of 25 mM. The five samples were irradiated at 125° C. for 5 sec, 15 sec, 30 sec, 45 sec, or 60 sec (corresponding to lines 80, 82, 84, 86, and 88, respectively) and resulted in NPs having diameters (as measured by DLS) of 69 nm, 78 nm, 102 nm, 103 nm, and 106 nm, respectively. This data is graphically shown in FIG. 15.

Figure 16:
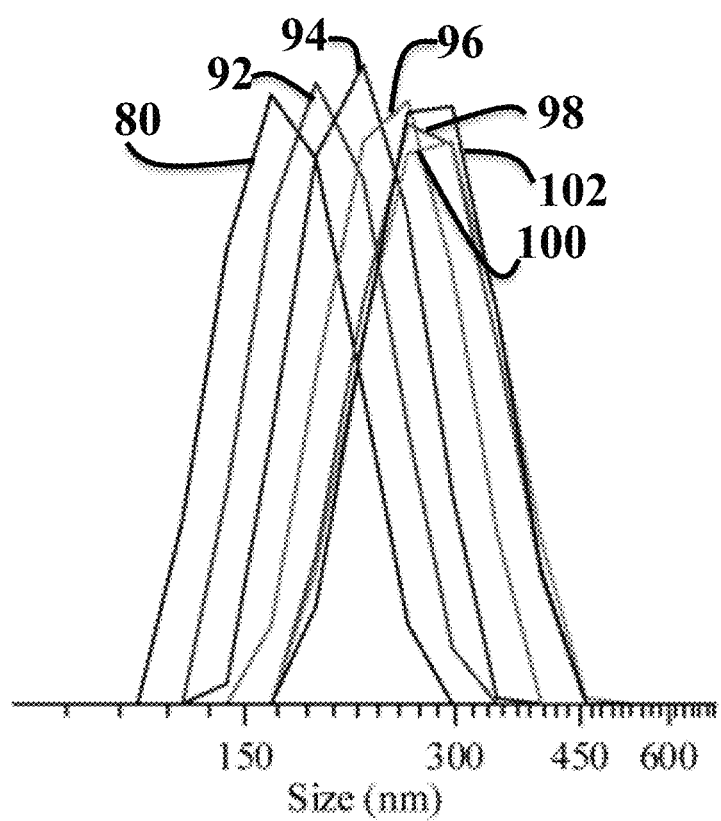

A second time-dependent reaction as carried out in seven separate reactions with an initial TMOS concentration of 50 mM. The seven samples were irradiated at 125° C. for 5 sec, 15 sec, 30 sec, 45 sec, 60 sec, 75 sec, or 90 sec (corresponding to lines 90, 92, 94, 96, 98, 100, and 102, respectively) and resulted in NPs having diameters (as measured by DLS) of 169 nm, 192 nm, 217 nm, 239 nm, 268 nm, 274 nm, and 273 nm, respectively. This data is graphically shown in FIG. 16.

Figure 17A:
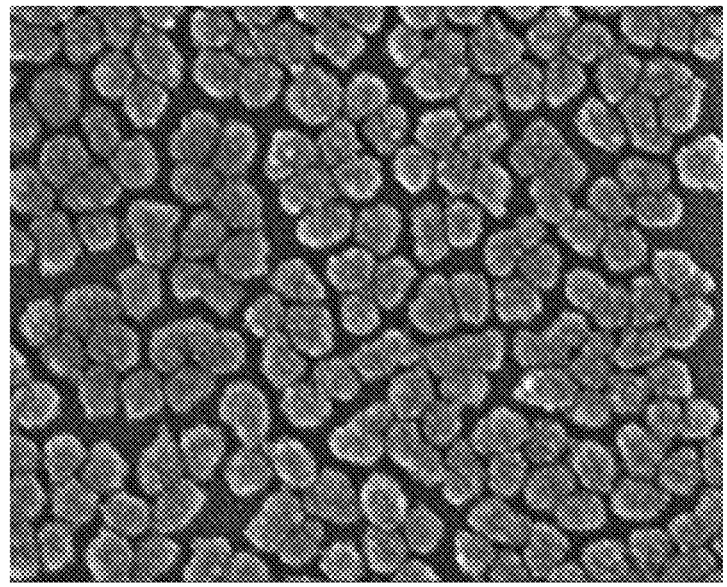
FIGS. 17A-17B are Scanning Electron Microscopic images of $SiO_2$NPs grown in 25 mM initial concentration of TMOS with a 5 sec reaction time are shown at 200 nm and 500 nm in-plane resolution, respectively.
Figure 17B:
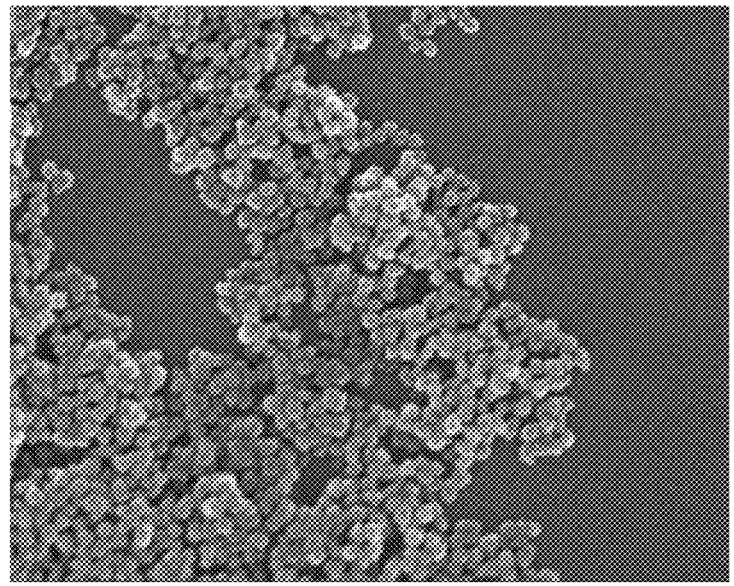
Figure 18A:
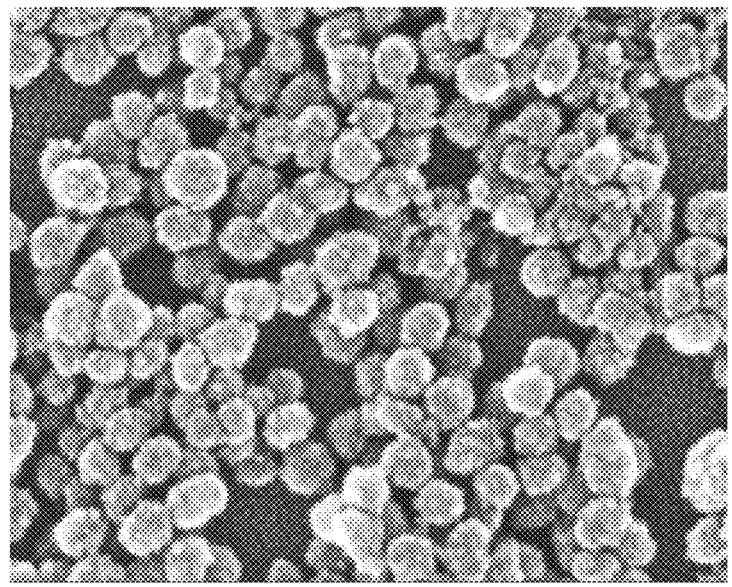
FIGS. 18A-18B are Scanning Electron Microscopic images of $SiO_2$ NPs grown in 25 mM initial concentration of TMOS with a 10 sec reaction time and an in-plane resolution of 200 nm and 500 nm, respectively.
Figure 18B:
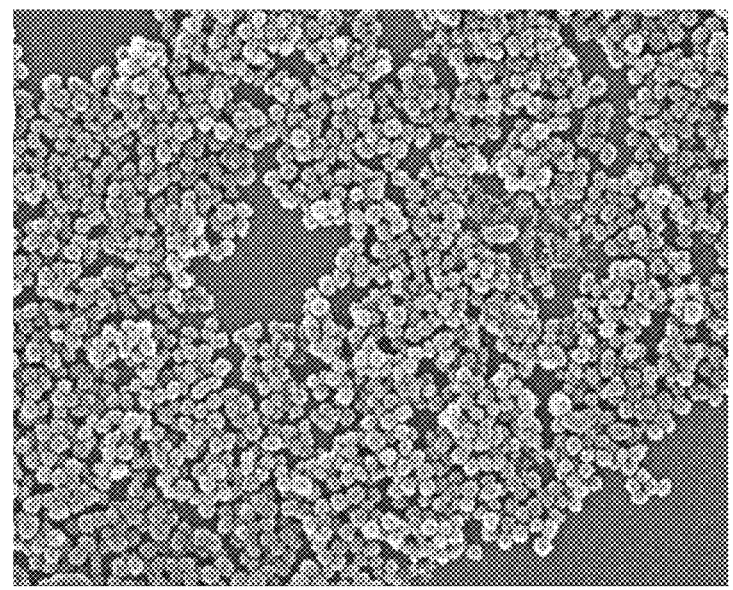
Figure 19A:
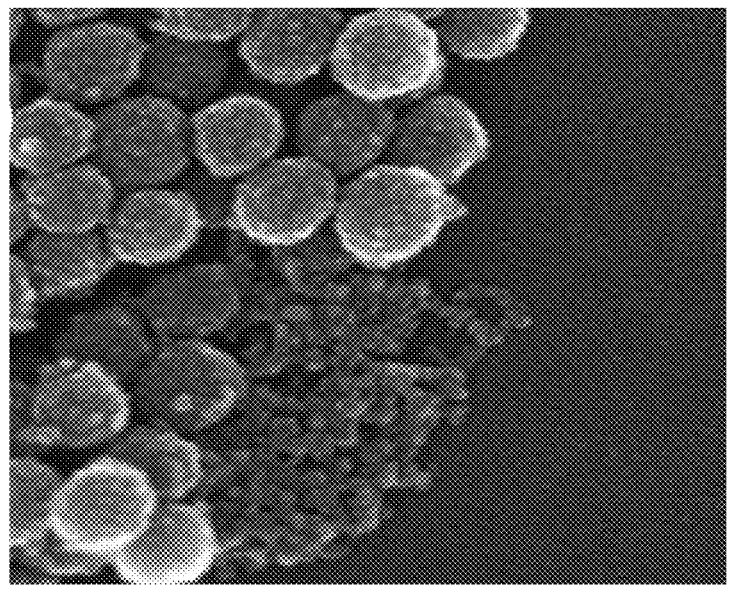
FIGS. 19A-19B are Scanning Electron Microscopic images of $SiO_2$ NPs grown in 25 mM initial concentration of TMOS with a 60 sec reaction time and an in-plane resolution of 200 nm and 500 nm, respectively.
Figure 19B:
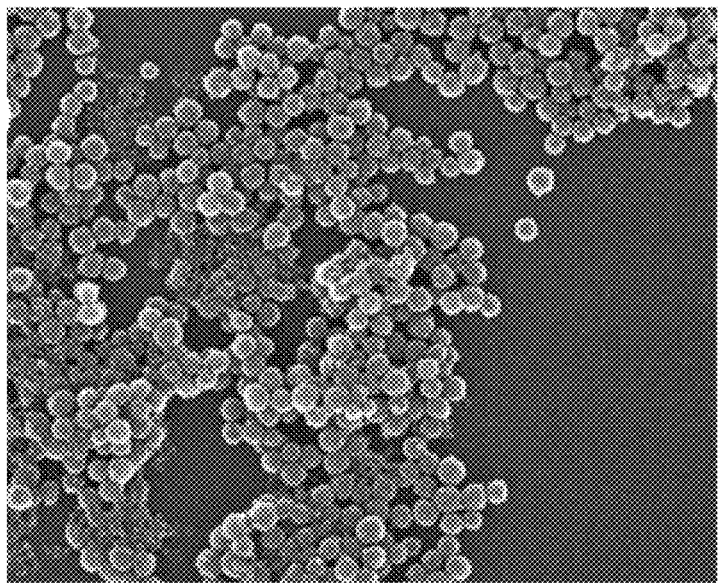

In FIGS. 17A and 17B, SEM images of $SiO_2$ NPs grown in 25 mM initial concentration of TMOS with a 5 sec reaction time are shown at 200 nm and 500 nm in-plane resolutions, respectively. The NPs are irregular and asymmetric, in shape, with rough surfaces and an average diameter of about 29±6 nm. At 10 sec reaction time, the NPs are more symmetric, are still rough, and have an average particle diameter of about 40±5 nm (SEM images at 200 nm and 500 nm in-plane resolutions, shown in FIGS. 18A and 19B, respectively). At the 60 sec reaction time, NPs have an average diameter of about 72±7 nm and rough surfaces (SEM images at 200 nm and 500 nm in-plane resolutions, shown in FIGS. 19A and 19B, respectively). Asymmetry and surface roughness were present in all synthesized NPs but were most pronounced for short reaction times. With increased reaction time, the NPs became more spherical but retained surface roughness, which may suggest that Ostwald ripening is not the primary synthetic mechanism for particle formation. Rather, it is believed that there is a degree of self-assembly associated with longer irradiation durations.

Figure 20:
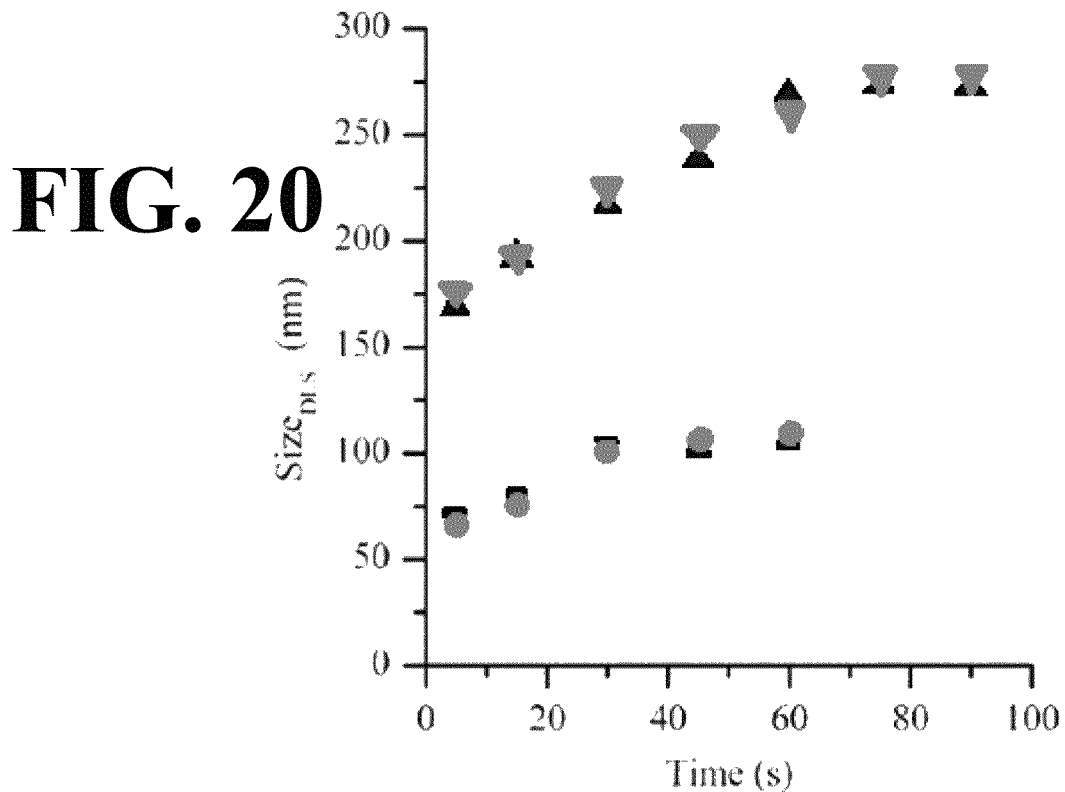
FIG. 20 is a graphical representation of a time-related change in diameter of $SiO_2$ NPs during synthesis in accordance with embodiments of the present invention.

FIG. 20 is a graphical representation of $SiO_2$ NP diameter (as measured by DLS) versus microwave irradiation time. $SiO_2$ NPs synthesized from an initial 25 mM concentration of TMOS (square data points) demonstrated a linear trend in diameter with reaction times ranging from about 5 sec to about 30 sec. $SiO_2$ NPs resulting from longer reaction times (i.e., greater than about 30 sec) demonstrate little-to-no growth of a maximum diameter, which was 104±2 nm. These results suggest the majority of silicic acid precursor is consumed within 30 sec of reaction time at the 25 mM initial TMOS concentration.

FIG. 20 further illustrates the results of linear growth for NPs synthesized from an initial 50 mM concentration of TMOS (triangular data points), wherein NP diameter increased linearly with reaction time for reaction times ranging from about 5 sec to about 60 sec. Reaction times greater than about 60 sec demonstrate little-to-no growth of maximum diameter, which was 272±3 nm. These results suggest that a majority of silicic acid precursor is consumed within about 60 sec of reaction time at the 50 mM initial TMOS concentration.

Prior to microwave heating, the prepared reaction solutions were stable for weeks with no evidence of condensation of the silica material. For example, $SiO_2$ NPs produced from the time dependent experiments were resized after one week using DLS. Minimal change in mean particle size was observed with an average measured change of 3.1±1.4% in $SiO_2$ NP diameter for the 25 mM series (square data points represent initial measurements; circular data points represent 1 week measurements), and an average measured change of 2.7±1.4% in $SiO_2$ NP diameter was observed for the 50 mM series (upwardly-directed triangles represent initial measurements; downwardly-directed triangles represent 1 week measurements). The minimal change in $SiO_2$ NP size overtime indicates the synthesis of $SiO_2$ NPs from TMOS in acetone under acid catalysis may be driven by microwave irradiation. Such observations also support a conclusion that particle formation may proceed in a manner that is fundamentally different from traditional Ostwald ripening driven Stöber syntheses. With longer reaction times, silicic acid monomers may further polymerize and depolymerize to yield generally more spherical particles. These observations are consistent with the physics of microwave-influenced molecular interactions: reductions in the degrees of freedom of movement of a molecule reduce an ability of the molecules to oscillate and interact with the EM field.

Example 3

FIGS. 22A-24B are transmission electron microscopy ("TEM") images collected for $SiO_2$ NPs to further investigate surface roughness. FIGS. 22A and 22B are images of $SiO_2$ NPs having diameters of about 49±5 nm at 10 nm and 20 nm in-plane resolutions, respectively. FIGS. 23A and 23B are images of $SiO_2$ NPs having diameters of about 163±13 nm at 20 nm and 50 nm in-plane resolution, respectively. FIGS. 24A and 24B are images of $SiO_2$ NPs having diameters of about 238±26 nm at 20 nm and 50 nm in-plane resolutions, respectively.

The 49±5 nm $SiO_2$NPs of FIGS. 22A and 22B appear truncated with flat surfaces and polyhedral in shape. $SiO_2$ NPs of FIGS. 23A-24B have smoother surfaces, as compared to those in FIGS. 22A and 22B, but some surface distortion remains. The $SiO_2$ NPs synthesized according to embodiments of the present invention lack the smooth surface indicative of conventional Stöber particles.

Irregular shaped $SiO_2$ NPs are observed at short reaction times (<30 sec) while more spherical shaped particles at longer reaction times (>30 sec). These observations may indicate that extended reaction times result in annealing and rearrangement of the particle surface to yield higher order, more symmetric particles. Silicic acid monomers having a plurality of bonds with the silica matrix undergo reduced polymerization/depolymerization and reduced oscillations with the microwave field.

Zeta potentials, measured in manner similar to those described in Example 1, were measured on "as prepared" and "cleaned" $SiO_2$ NPs to determine a degree of particle stability. "As prepared" solutions measured zeta potentials of −15.4±0.3 mV; "cleaned" samples measured zeta potentials of −30.0±1.7 mV. The difference in zeta potentials between prepared and cleaned solutions would suggest that removal of residuals from the reaction solution may increase NP stability by the formation of a stable water monolayer or solvent layer resulting from the cleaning procedure.

Example 4

Molybdenum complexation assays were performed to determine the concentration of precursor to colloidal $SiO_2$ NPs under microwave heating. A molybdic acid solution was prepared using 2 g of ammonium molybdate hydrate and 6 mL of concentrated HCl. The mixture was diluted with water to 100 mL, and 1.5 mL samples thereof were further diluted with 15 mL of water. Aliquots, ranging from about 5 μL to about 100 μL in volume of the silicic acid, described above, were added to the mixture and allowed to equilibrate for 15 min. Formation of the silico-molybdate species was indicated by the solution turning yellow, after a few seconds of injection of the reaction solution containing residual silicic acid. The concentration of silico-molybdate species was determined by UV-Vis spectroscopy at a wavelength of 410 nm. Repeated scans of each solution were performed to ensure the concentration of the silico-molybdate complex did not change over the course of the experiment.

Stoichiometrically, only one silicic acid monomer will bind in formation with the silico-molybdate species. Unfortunately, because molybdate only binds to monomers of silicic acid, dimers, trimers, and larger oligomers were not detected.

Figure 21:
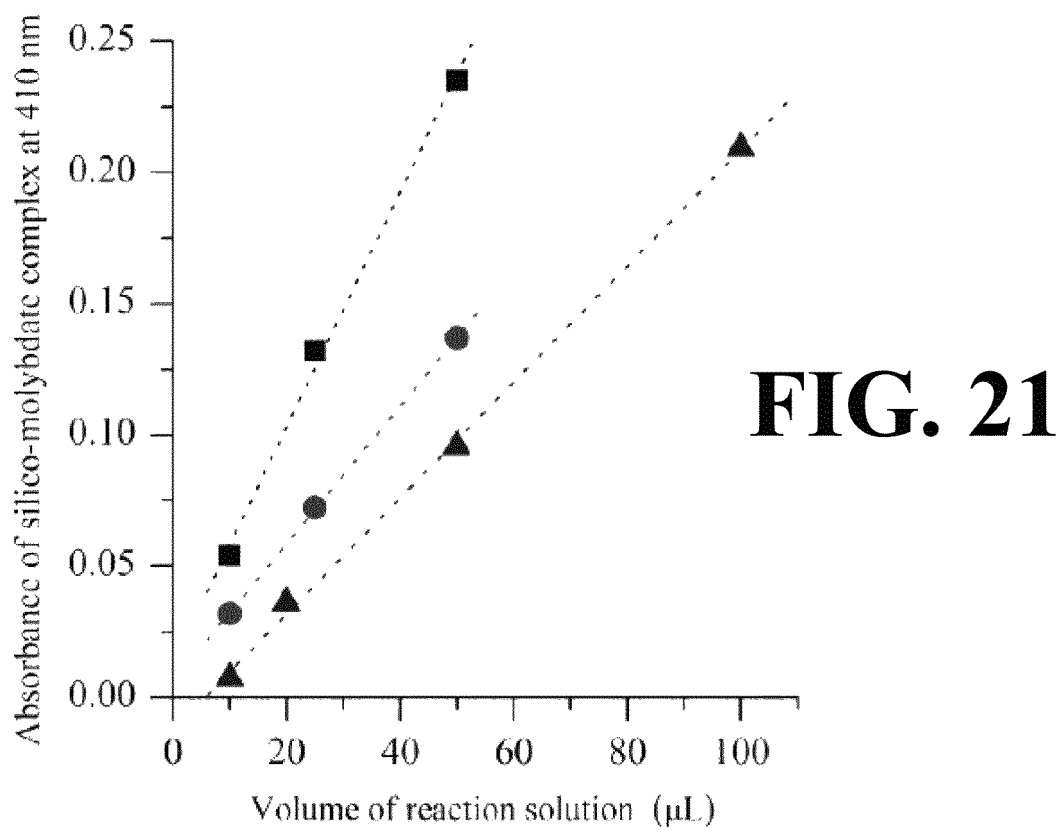
FIG. 21 is a graphical representation of silico-molybdate complex species measured by UV-Vis at 410 nm.

FIG. 21 is a graphical representation of a sample of silico-molybdate (as measured by UV-Vis at 410 nm) before exposure of microwaves (black square data points) and two solutions of $SiO_2$ NPs formed under microwave heating with initial TMOS concentrations of 25 mM and 50 mM (blue triangle and red circle data points, respectively). All three traces demonstrated a linear dependence with an increased volume of the reaction solution comprising silicic acid, which provides a method for determining a relative conversion of silicic acid to colloidal $SiO_2$ NPs. Assuming the pre-microwave trace (black square data points) of FIG. 21 represents a solution containing the highest possible concentration of silicic acid monomer, relative conversion rates of silicic acid to colloidal $SiO_2$ NPs may be determined for the reactions, wherein colloidal $SiO_2$ NPs are produced through microwave heating. Monomer concentration should be greatest immediately after hydrolysis of TMOS and should be stable in the pre-microwave solution because the NP growth was not observed without microwave heating (refer again to FIG. 20).

A relative rate of precursor conversion may be determined from the change in slope of separate traces in FIG. 21. The slope for the pre-microwave trace (black square data points) is $4.48 \times 10^{-3}$, with an $R^2$ value of 0.9959. The slopes for the 25 mM and 50 mM traces are $2.62 \times 10^{-3}$ ($R^2=0.9998$) and $2.21 \times 10^{-3}$ ($R^2=0.9986$), respectively. Comparing the slope of the 25 mM sample with the slope of the pre-microwave sample, a relative amount of silico-molybdate remaining after microwave heating is determined to equal 58%, which is equated to a 42% conversion of silicic acid to colloidal $SiO_2$ NP for the 25 mM reaction. A relative amount of silico-molybdate remaining in the 50 mM sample after microwave heating was determined to equal 49%, which is equated to a 51% conversion of silicic acid to colloidal $SiO_2$ NP for the 50 mM reaction. It is believed that the 50 mM reaction had a higher rate of conversion because the greater concentration of available precursor to couple with the EM field, which permits quicker growth kinetics for this concentration.

The presence of the yellow silico-molybdate species in the microwave irradiated samples, as measured by UV-Vis, suggests the positive presence for residual silicic acid monomers after microwave heating and incomplete conversion to $SiO_2$ NPs for the reactions. However, this result seems to be contradictory to DLS data, which demonstrated a linear dependence in NP growth followed with minimal growth (refer again to FIGS. 3 and 20). Residual silicic acid in the solution may explain the presence of the random condensed silica in the SEM (FIGS. 16A-13B and 17A-19B) and TEM (FIGS. 22A-24B) as the residual silicic acid is responsible for a formation of amorphous silica and condenses as the solvent evaporates in preparation of samples for imaging even with the cleaning procedures employed.

Example 5

Silica is a material of great interest for use in applications, such as drug delivery and sensors, because silica is a highly transparent dielectric material with high surface area that can be easily functionalized with low toxicity. According to various embodiments of the present invention, $SiO_2$ NPs, of varying diameters, may be quickly and reproducibly synthesized. According to still other embodiments of the present invention, $SiO_2$ NPs may be used to encapsulate substrates, or the $SiO_2$ NPs may be condensed in the presence of other compounds of interest, such as chromophores, biocides, or catalysts.

Because of the associated high surface area, synthesized $SiO_2$ NPs according to these methods may serve as effective adsorbents and provide benefit in the development and manufacture of garments that protect against vapors as well as liquids without significantly increasing the weight of the fabric.

FIG. 25 is an SEM image of a cotton fiber coated with CdSe/ZnS/$SiO_2$ NPs, which were synthesized in accordance with methods described herein and bound to the cotton fiber by microwave-assisted methods. CdSe/ZnS quantum dots with emissions at 525 nm and 625 nm were encapsulated with a $SiO_2$ shell by suspending a 2 nM solution of each of the selected quantum drops in toluene in a test tube. The encapsulated quantum dots were precipitated with methanol, centrifuged, decanted, and dried, under vacuum, to remove residual solvent. 110 μL (525 nm CdSe/ZnS) and 230 μL (625 nm CdSe/ZnS) of 3-mercaptopropyltrimethoxysilane ("MPS") were added to the respective pellets, sonicated for 2 to 3 min, and heated in a water bath overnight (temperature ranging from 50° C. to 55° C.). 1 mL of methanol was added to each mixture and followed with the addition of 8.5 mL of acetone. The alkoxysilanes of the MPS were hydrolyzed with 500 μL of 1 mM HCl. From this solution, a 4 mL aliquot was positioned within the microwave and heated at 125° C. for about 60 sec.

UV-Vis data of the pre-toluene suspended CdSe/ZnS and post-acetone suspended CdSe/ZnS/$SiO_2$ were nearly identical. The CdSe/ZnS solution was diluted with a silicic acid solution prepared from 300 μL of 0.1 M HCl and 60 μL TMOS. To apply the CdSe/ZnS solution to fibers, 1 mL aliquots of the silicic acid diluted CdSe/ZnS solution were applied to cotton fibers and heated in the microwave at 125° C. for about 30 sec. A total of three treatments were used in the preparation of each quantum dot coated cotton fiber.

Figure 26:
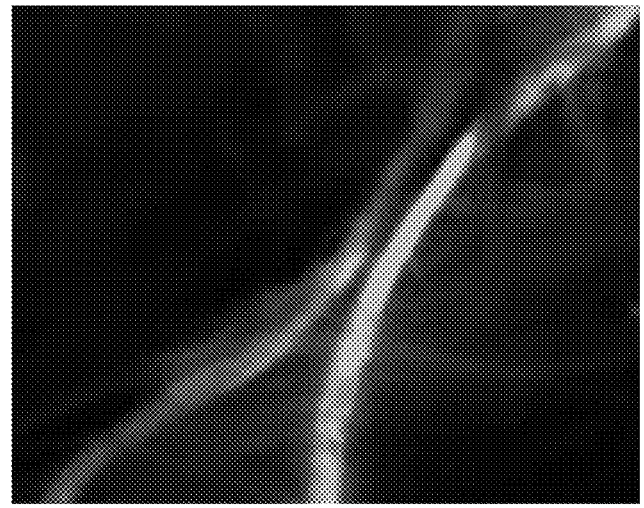
FIG. 26 is a fluorescent microscopy image of cotton fibers treated with CdSe quantum dots at 525 nm.
Figure 27:
FIG. 27 is a fluorescent microscopy image of cotton fibers treated with CdSe quantum dots at 625 nm.

FIGS. 26 and 27 are fluorescent microscopy images of the cotton fibers demonstrating emissive properties of the NPs at 525 nm (FIG. 26) and 625 nm (FIG. 27), respectively. These images suggest the presence of quantum dots on the cotton fibers. As shown, the CdSe quantum dots maintain functionality while being protected against oxidation via the $SiO_2$ NPs and solubility in acetone.

Example 6

The $SiO_2$ NP synthesis was carried out as specific in Example 1 and in the presence of graphite nanofibers having dimensions (outer diameter×inner diameter×length) ranging from (200 nm-500 nm)×(1 nm-10 nm)×(10 μm-40 μm).

Figure 28A:
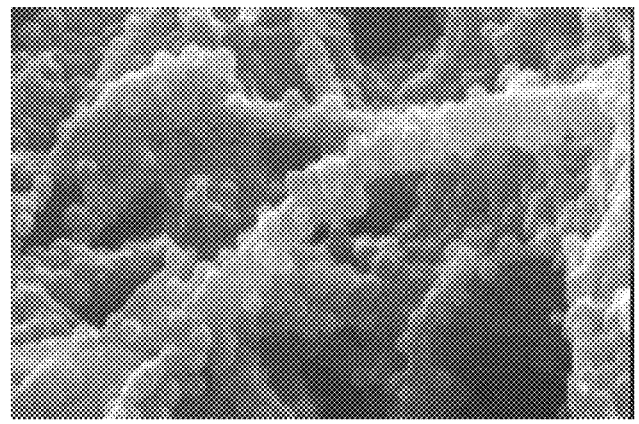
FIGS. 28A and 28B are Scanning Electron Microscopic images of first sample of resulting $SiO_2$ NP coated nanofibers, both at 2 μm resolution and acquired with an exposure time of 45 sec, a power of 300 W, and a temperature of 125° C.
Figure 28B:
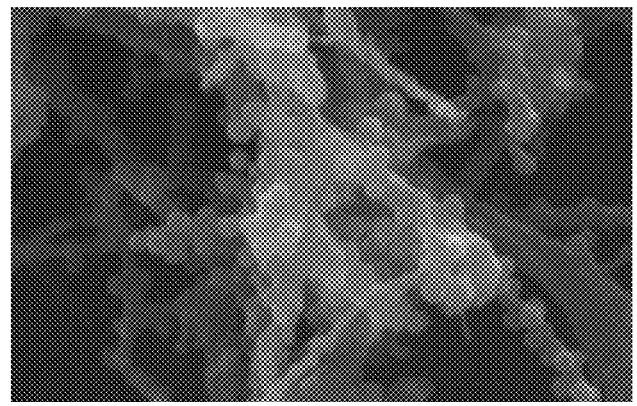

FIGS. 28A and 28B are SEM images of a first sample of resulting $SiO_2$ NP coated nanofibers. The images are at 2 μm resolution and were acquired with an exposure time of 45 sec, a power of 300 W, and a temperature of 125° C.

Figure 29A:
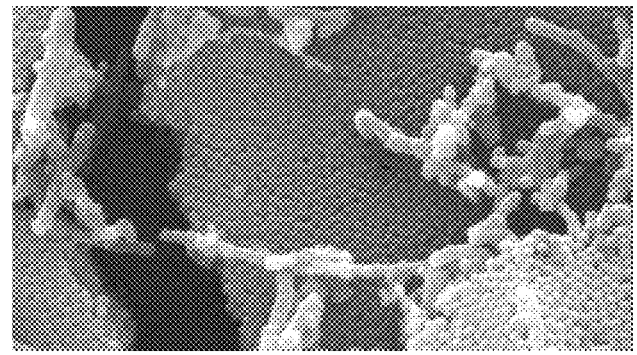
FIGS. 29A-29C are Scanning Electron Microscopic images of second sample of resulting $SiO_2$ NP coated nanofibers at 5 μm, 2.5 μm, and 2 μm resolutions, respectively.
Figure 29B:
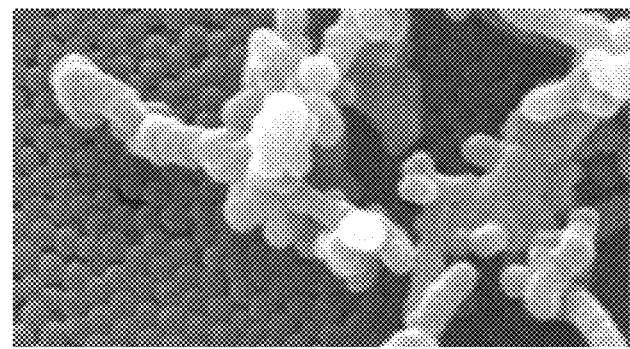
Figure 29C:
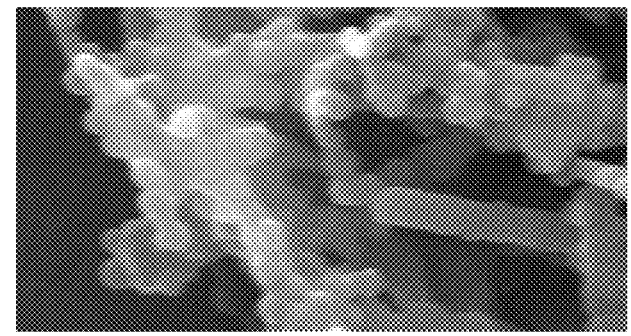

FIGS. 29A-29C are SEM images of a second sample of resulting $SiO_2$ NP coated nanofibers at 5 μm, 2.5 μm, and 2 μm resolutions, respectively. The images were acquired with a 60 sec exposure time, a power of 300 W, and a temperature of 125° C.

Example 7

TMOS-based fluorescent $SiO_2$ NPs were synthesized with 1 mg, 4 mg, and 7 mg of Rhodamine 6G per 40 mL of solvent (here, acetone). The Rhodamine in acetone was mixed for 30 sec with subsequent ultrasonication, if necessary. 800 μL of 1 mM HCl solution was mixed with 150 μL of TMOS for 30 sec. The TMOS mixture and the Rhodamine mixture were mixed for 30 sec and 5 mL of each mixed, final solution were placed in 10 mL CEM vial for microwave exposure. The final solution in the CEM vial was subjected to microwave field until the surface of the vial has reached 125° C., at which time the temperature of the vial was maintained for 60 sec. The resulting suspension was transferred in dialysis membranes and dialyzed against water. Diameters of resultant $SiO_2$ NPs ranged from 190 nm to 230 nm (±20-40 nm).

The resulting suspensions were not stable in aqueous solution and collapsed if allowed to remain in steady conditions. Ultrasonication restores the original distribution.

Figure 30A:
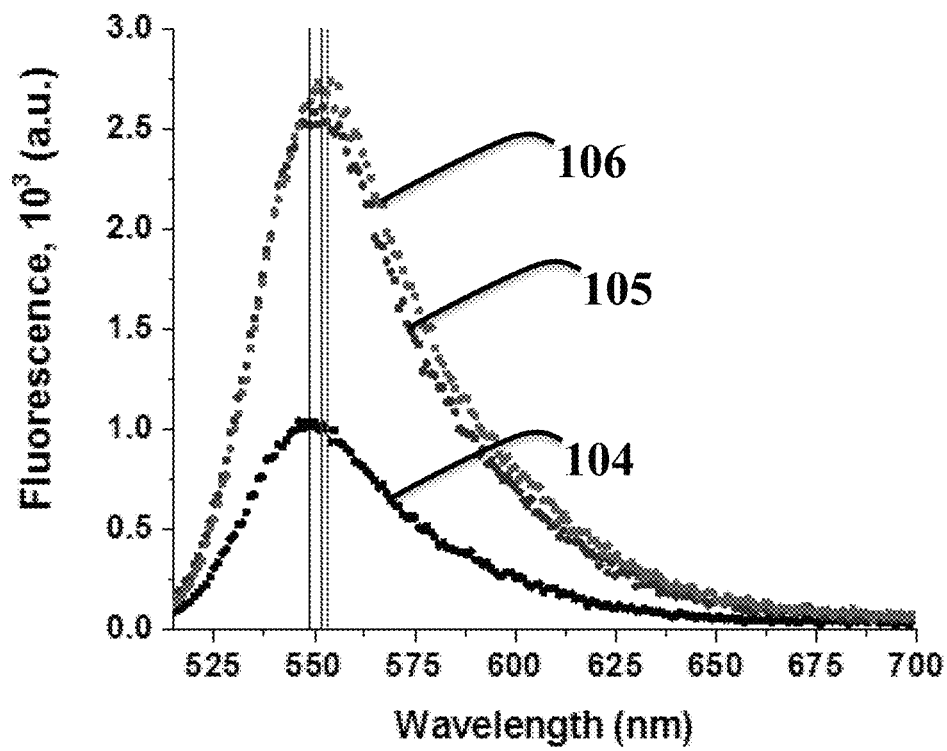
FIG. 30A is an emission spectrum of the 1 mg, 4 mg, and 7 mg Rhodamine $SiO_2$ NP samples (excitation wavelength is 488 nm).

FIG. 30A is an emission spectrum of the 1 mg, 4 mg, and 7 mg Rhodamine $SiO_2$ NP samples (corresponding to lines 104, 105, 106, respectively) at an excitation wavelength of 488 nm. The 1 mg Rhodamine $SiO_2$ NP sample demonstrated a blue shift.

Figure 30B:
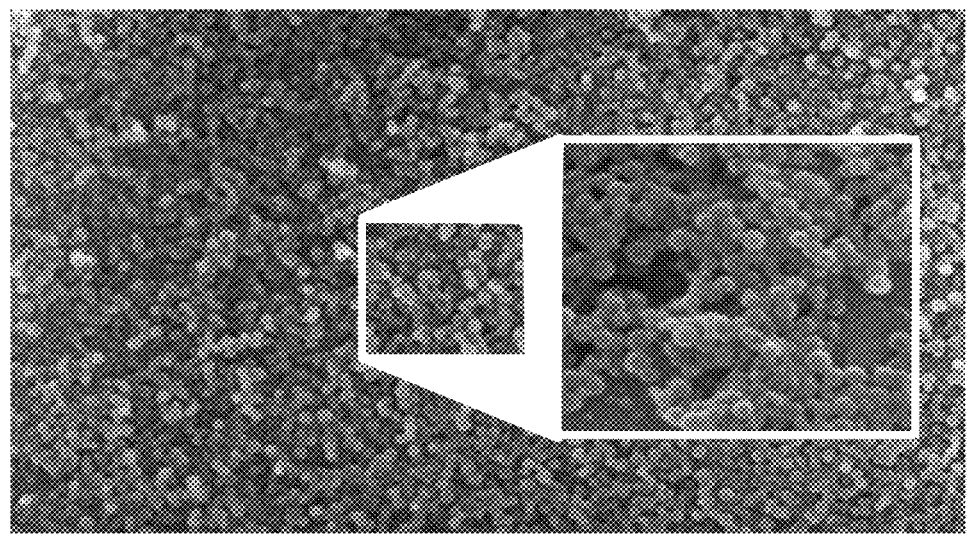
FIG. 30B is a Scanning Electron Microscopic images of one of the Rhodamine $SiO_2$ NP samples at an in-plane resolution of 5 μm and with an enlarged insert.

FIG. 30B is a SEM image of one of the Rhodamine $SiO_2$ NP samples at an in-plane resolution of 5 μm and with an enlarged insert.

Example 8

TEOS-based fluorescent $SiO_2$ NPs were synthesized with 1 mL TEOS in 0.7 mL of solvent (here, $H_2O$). TEOS, water, and 1 mL of HCl was mixed for 30 sec. 3.5 mg of Rose Bengal was added to 40 mL of solvent (here, acetone) and mixed. 0.35 mL of the hydrolyzed TEOS solution was added to the Rose Bengal solution and mixed for 30 sec; 5 mL of the resulting solution were placed in 10 mL CEM vial. The resulting solution and the vial were subjected to microwave field until the surface of the vial has reached 125° C., at which time the temperature of the vial was maintained for 60 sec. Diameters of resultant $SiO_2$ NPs were approximately 216±30 nm.

The suspension was not stable in aqueous solution and collapsed if allowed to remain in steady conditions.

Figure 31:
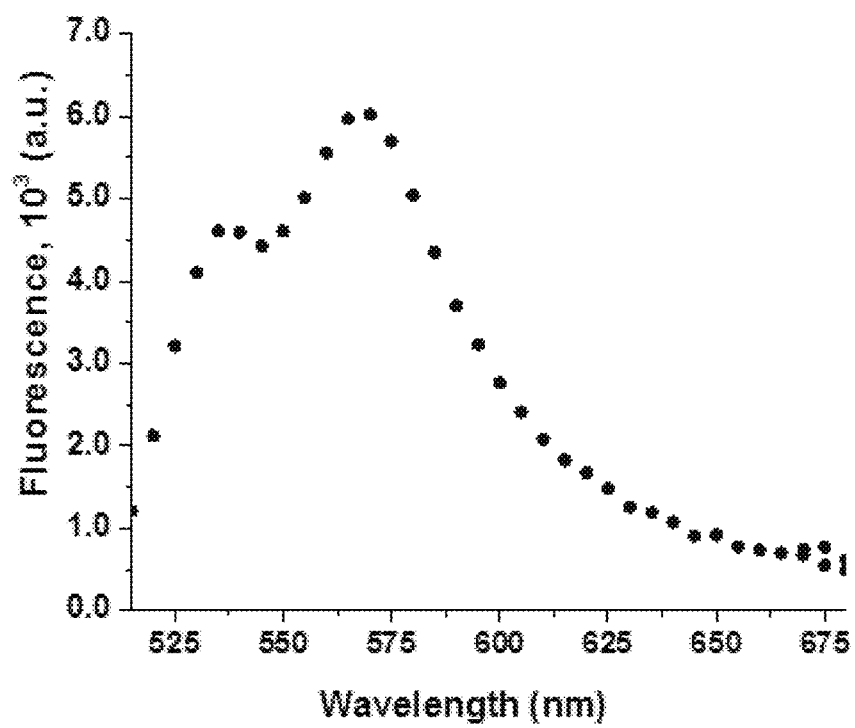
FIG. 31 is an exemplary emission spectrum of the Rose Bengal $SiO_2$ NPs.

FIG. 31 is an exemplary emission spectrum of the Rose Bengal $SiO_2$ NPs.

Example 9

TEOS-based fluorescent $SiO_2$ NPs were synthesized with 1 mL TEOS in 0.7 mL of solvent (here, $H_2O$) with 1 mL of HCl. The solution was mixed for 30 sec. 2 mg of Rose Bengal and 0.5 mg of R640 were added to 40 mL of solvent (here, acetone) and mixed. 0.35 mL of the hydrolyzed TEOS solution was added to the Rose Bengal/R640 solution and mixed for 30 sec; 5 mL of the final solution were placed in 10 mL CEM vial. The final solution in the vial was subjected to microwave field until the surface of the vial has reached 125° C., at which time the temperature of the vial was maintained for 60 sec. Diameters of resultant $SiO_2$ NPs were approximately 260±33 nm.

The suspension was not stable in aqueous solution and collapsed if allowed to remain in steady conditions.

Figure 32:
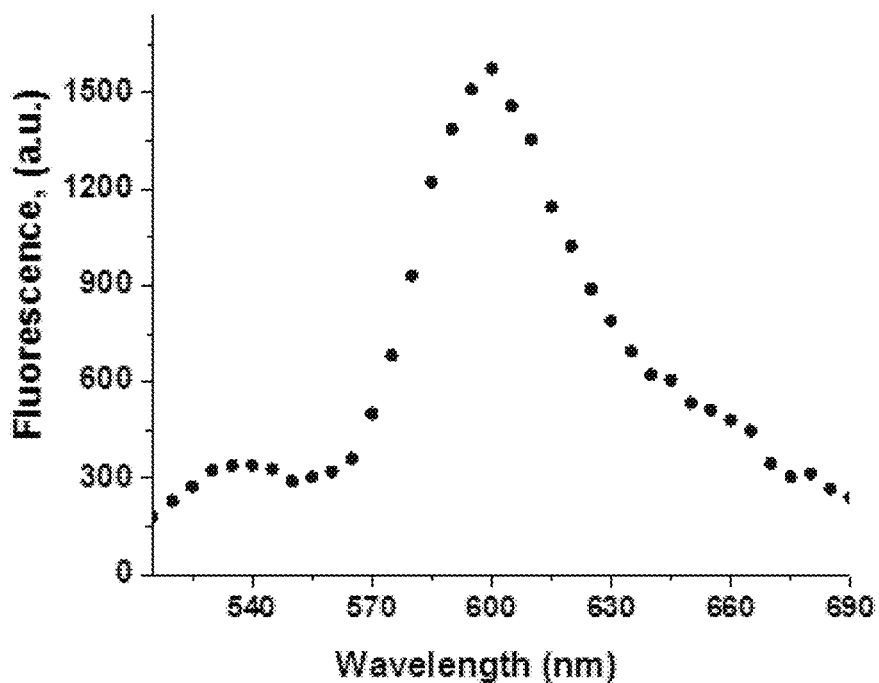
FIG. 32 is an exemplary emission spectrum of the Rose Bengal/R640 $SiO_2$ NPs.

FIG. 32 is an exemplary emission spectrum of the Rose Bengal/R640 $SiO_2$ NPs.

Methods according to the various embodiments of the present invention provide for a controlled microwave-assisted synthesis of $SiO_2$ NPs via acid-catalysis of tetramethylorthosilicate (TMOS) in acetone. Resultant NPs have diameters ranging from about 30 nm up to about 250 nm. The reaction conditions are unique in that silica condensation is not observed without microwave heating. It is through microwave-assisted techniques that colloidal $SiO_2$ NP sols are achieved, whereas silica gels are conventionally formed under similar acidic conditions. The growth of $SiO_2$ NPs by the microwave-assisted methods is accurate, precise, and quick, with reaction times on the order of seconds to minutes. Control over NP diameters may be achieved by varying an initial concentration of silicic acid precursor and a duration of microwave irradiation exposure.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A functionalized fiber comprising:
   a fiber strand; and
   silica nanoparticles at least partially encapsulating the fiber strand, the silica nanoparticles being synthesized by:
   hydrolyzing a tetramethyl orthosilicate in hydrochloric acid to form silicic acid monomers;
   diluting the silicic acid monomers in acetone;
   irradiating the diluted silicic acid monomers for a time that is less than 90 seconds with an energy source configured to generate microwave frequency energy to polymerize the silicic acid monomers into the silica nanoparticles; and
   complexing the silica nanoparticles with molybdenum by preparing a molybdic acid solution and titrating the silica nanoparticles with the molybdic acid solution.

2. The functionalized fiber of claim 1, wherein the fiber strand comprises cotton.

3. The functionalized fiber of claim 1, wherein the fiber strand comprises nanofiber.

4. The functionalized fiber of claim 1, wherein the synthesis further comprises:
   introducing a dopant to the silica nanoparticles before irradiating.

5. A functionalized fiber comprising:
   a fiber strand;
   a coating about at least a portion of the fiber strand, the coating comprising a first plurality of silica nanoparticles and a second plurality of silica nanoparticles that is not the first plurality of silica nanoparticles.

6. The functionalized fiber of claim 5, wherein the first plurality of silica nanoparticles, the second plurality of silica nanoparticles, or both includes a dopant selected from the group consisting of a metal, a biocide, a chromophore, or flame retardant, or a semiconductor.

7. The functionalized fiber of claim 5, wherein the first plurality of silica nanoparticles, the second plurality of silica nanoparticles, or both is synthesized from a water-soluble microwave reactive silicon species.

8. The functionalized fiber of claim 7, wherein the water-soluble microwave reactive silicon species is tetraethyl orthosilicate or tetramethylorthosilicate.

9. The functionalized fiber of claim 5, where the coating is synthesized by:
- hydrolyzing a first water-soluble microwave reactive silicon species in acid to form first silicic acid monomers;
- hydrolyzing a second water-soluble microwave reactive silicon species in acid to form second silicic acid monomers;
- diluting the first and second silicic acid monomers in acetone; and
- irradiating the first and second diluted silicic acid monomers for a time that is less than 90 seconds with an energy source configured to generate microwave frequency energy to polymerize the first and second silicic acid monomers into the first and second pluralities of silica nanoparticles, respectively.

\* \* \* \* \*